(12) United States Patent
Gajiwala et al.

(10) Patent No.: US 11,294,469 B2
(45) Date of Patent: Apr. 5, 2022

(54) SYSTEM AND METHOD FOR PROCESSING USER INPUT VIA A RECONFIGURABLE HAPTIC INTERFACE ASSEMBLY FOR DISPLAYING A MODIFIED KEYBOARD CONFIGURATION

(71) Applicant: Dell Products, LP, Round Rock, TX (US)

(72) Inventors: Priyank Gajiwala, Austin, TX (US); Michiel Knoppert, Amsterdam (NL); Thomas M. Hinskens, Utrecht (NL)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/779,554

(22) Filed: Jan. 31, 2020

(65) Prior Publication Data
US 2021/0240266 A1  Aug. 5, 2021

(51) Int. Cl.
*G06F 3/0354* (2013.01)
*G06F 3/044* (2006.01)
(Continued)

(52) U.S. Cl.
CPC .......... *G06F 3/016* (2013.01); *G06F 3/03547* (2013.01); *G06F 3/044* (2013.01); *G06F 3/04842* (2013.01); *G06F 3/04847* (2013.01)

(58) Field of Classification Search
CPC .. G06F 3/04144; G06F 3/0416; G06F 3/0216; G06F 3/0414; G06F 3/0412;
(Continued)

(56) References Cited

U.S. PATENT DOCUMENTS 4,618,797 A   10/1986 Cline
4,857,887 A    8/1989 Iten
(Continued)

FOREIGN PATENT DOCUMENTS

KR      100442116 B1   7/2004
KR    20040081697 A    9/2004
(Continued)

OTHER PUBLICATIONS

Kane et al. "Touchplates: Low-Cost Tactile Overlays for Visually Impaired Touch Screen Users", ASSETS '13, Oct. 21-23, 2013, Bellevue, WA, USA, ACM 978-1-4503-2405-2/13/10 . . . $15.00 (Year: 2013).*

(Continued)

*Primary Examiner* — Julie Anne Watko
(74) *Attorney, Agent, or Firm* — Prol Intellectual Property Law, PLLC; H. Kenneth Prol

(57) ABSTRACT

A reconfigurable haptic interface assembly of an information handling system may comprise a coversheet display layer displaying a key location of a haptic keyboard based on a modified configuration, a contact foil placed between the coversheet layer and a support layer, and a piezoelectric element placed between the contact foil and the support layer receiving an applied mechanical stress near the displayed key location, and transmitting a generated piezo actuation signal via the contact foil. A processor may receive the piezo actuation signal, identify x- and y-coordinate location data describing the displayed key location based, in part, on the piezo actuation signal, identify a keyboard scan code associated with the x- and y-coordinate location data, and send a haptic feedback response signal to the piezoelectric element to generate a haptic feedback at the key location and a digital display may display a key register event.

20 Claims, 8 Drawing Sheets

(51) Int. Cl.
*G06F 3/0484* (2013.01)
*G06F 3/01* (2006.01)
 G06F 3/0487 (2013.01)
 G06F 3/04842 (2022.01)
 G06F 3/04847 (2022.01)

(58) Field of Classification Search
 CPC ...... G06F 3/041; G06F 3/016; G06F 3/03547;
 G06F 3/044; G06F 3/04842; G06F
 3/04847; G06F 3/0484; G06F 3/0481;
 G06F 3/048; G06F 3/045; G06F 3/0447;
 G06F 3/04146; G06F 3/03; G06F 3/0238;
 G06F 3/023; G06F 3/0221; G06F 3/0219;
 G06F 3/02; G06F 3/01; G06F 3/00; G06F
 3/0354; G06F 3/04886; G06F 1/169;
 G06F 3/0213
 See application file for complete search history.

(56) References Cited

U.S. PATENT DOCUMENTS

| | | | |
|---|---|---|---|
| 5,351,066 A * | 9/1994 | Rucker | B41J 5/105 |
| | | | 341/20 |
| 5,463,388 A | 10/1995 | Boie | |
| 5,825,352 A | 10/1998 | Bisset | |
| 5,861,583 A | 1/1999 | Schediwy | |
| 5,887,995 A | 3/1999 | Holehan | |
| 6,147,680 A | 11/2000 | Tareev | |
| 6,188,391 B1 | 2/2001 | Seely | |
| 6,239,790 B1 | 5/2001 | Martinelli | |
| 6,437,485 B1 * | 8/2002 | Johansson | H01L 41/0946 |
| | | | 310/328 |
| 6,532,824 B1 | 3/2003 | Ueno | |
| 6,574,095 B2 | 6/2003 | Suzuki | |
| 6,680,731 B2 | 1/2004 | Gerpheide | |
| 6,703,550 B2 | 3/2004 | Chu | |
| 6,822,635 B2 | 11/2004 | Shahoian | |
| 6,882,337 B2 | 4/2005 | Shetter | |
| 7,336,260 B2 | 2/2008 | Martin | |
| 7,439,962 B2 | 10/2008 | Reynolds | |
| 7,486,279 B2 | 2/2009 | Wong | |
| 7,523,410 B2 | 4/2009 | Rekimoto | |
| 7,535,454 B2 | 5/2009 | Jasso | |
| 7,741,979 B2 | 6/2010 | Schlosser | |
| 7,808,488 B2 | 10/2010 | Martin | |
| 8,144,453 B2 | 3/2012 | Brown | |
| 8,159,461 B2 | 4/2012 | Martin | |
| 8,164,573 B2 | 4/2012 | DaCosta | |
| 8,199,033 B2 | 6/2012 | Peterson | |
| 8,248,277 B2 | 8/2012 | Peterson | |
| 8,248,278 B2 | 8/2012 | Schlosser | |
| 8,279,052 B2 | 10/2012 | Heubel | |
| 8,294,600 B2 | 10/2012 | Peterson | |
| 8,294,677 B2 | 10/2012 | Wu | |
| 8,373,664 B2 | 2/2013 | Wright | |
| 8,477,113 B2 | 7/2013 | Wu | |
| 8,508,487 B2 | 8/2013 | Schwesig | |
| 8,542,134 B2 | 9/2013 | Peterson | |
| 8,581,710 B2 | 11/2013 | Heubel | |
| 8,633,916 B2 | 1/2014 | Bernstein | |
| 8,674,941 B2 | 3/2014 | Casparian | |
| 8,749,507 B2 | 6/2014 | DaCosta | |
| 8,760,273 B2 * | 6/2014 | Casparian | H01H 13/702 |
| | | | 340/407.2 |
| 8,773,356 B2 | 7/2014 | Martin | |
| 8,797,295 B2 | 8/2014 | Bernstein | |
| 8,842,091 B2 | 9/2014 | Simmons | |
| 9,178,509 B2 | 11/2015 | Bernstein | |
| 9,229,550 B1 * | 1/2016 | Coley | G06F 3/041 |
| 9,274,660 B2 | 3/2016 | Bernstein | |
| 9,280,248 B2 | 3/2016 | Bernstein | |
| 9,318,006 B2 | 4/2016 | Heubel | |
| 9,336,969 B2 | 5/2016 | Takashima | |
| 9,400,582 B2 | 7/2016 | Bernstein | |
| 9,477,342 B2 | 10/2016 | Daverman | |
| 9,535,557 B2 | 1/2017 | Bernstein | |
| 9,563,305 B2 * | 2/2017 | Dimitrov | G06F 3/046 |
| 9,820,055 B2 * | 11/2017 | Babayoff | H04R 3/00 |
| 9,829,982 B2 | 11/2017 | Bernstein | |
| 10,089,840 B2 | 10/2018 | Moussette | |
| 10,120,450 B2 | 11/2018 | Bernstein | |
| 10,591,993 B2 * | 3/2020 | Lehmann | G06F 3/03545 |
| 10,860,112 B1 | 12/2020 | Knoppert | |
| 2006/0109255 A1 | 5/2006 | Chen | |
| 2006/0238510 A1 * | 10/2006 | Panotopoulos | G06F 3/0202 |
| | | | 345/168 |
| 2007/0063987 A1 | 3/2007 | Sato | |
| 2007/0273671 A1 | 11/2007 | Zadesky | |
| 2008/0098456 A1 | 4/2008 | Alward | |
| 2008/0202824 A1 | 8/2008 | Philipp | |
| 2008/0259046 A1 | 10/2008 | Carsanaro | |
| 2009/0002140 A1 * | 1/2009 | Higa | G06F 1/1652 |
| | | | 340/407.1 |
| 2009/0002178 A1 | 1/2009 | Guday | |
| 2009/0243817 A1 | 10/2009 | Son | |
| 2009/0298546 A1 * | 12/2009 | Kim | G06F 1/1686 |
| | | | 455/566 |
| 2009/0315854 A1 | 12/2009 | Matsuo | |
| 2010/0079410 A1 * | 4/2010 | Minton | G06F 3/016 |
| | | | 345/175 |
| 2010/0089735 A1 | 4/2010 | Takeda | |
| 2010/0090813 A1 * | 4/2010 | Je | G06F 3/016 |
| | | | 340/407.2 |
| 2010/0102830 A1 | 4/2010 | Curtis | |
| 2010/0110018 A1 | 5/2010 | Faubert | |
| 2010/0128002 A1 | 5/2010 | Stacy | |
| 2010/0162109 A1 * | 6/2010 | Chatterjee | G06F 3/04886 |
| | | | 715/702 |
| 2010/0177050 A1 * | 7/2010 | Heubel | G06F 3/0416 |
| | | | 345/173 |
| 2011/0234502 A1 * | 9/2011 | Yun | G06F 3/0414 |
| | | | 345/173 |
| 2011/0304550 A1 * | 12/2011 | Romera Jolliff | G06F 3/016 |
| | | | 345/168 |
| 2012/0062491 A1 | 3/2012 | Coni | |
| 2012/0092263 A1 * | 4/2012 | Peterson | H01H 13/85 |
| | | | 345/168 |
| 2012/0105333 A1 * | 5/2012 | Maschmeyer | G06F 3/016 |
| | | | 345/173 |
| 2012/0260164 A1 * | 10/2012 | Scheufler | G06F 3/016 |
| | | | 715/702 |
| 2012/0299853 A1 * | 11/2012 | Dagar | G09B 21/003 |
| | | | 345/173 |
| 2012/0313857 A1 * | 12/2012 | Senanayake | G06F 3/016 |
| | | | 345/168 |
| 2013/0249802 A1 | 9/2013 | Yasutake | |
| 2014/0340208 A1 * | 11/2014 | Tan | H01H 13/83 |
| | | | 340/407.2 |
| 2015/0091806 A1 * | 4/2015 | Mahajan | G06F 3/04886 |
| | | | 345/168 |
| 2015/0091859 A1 * | 4/2015 | Rosenberg | G06F 3/04162 |
| | | | 345/174 |
| 2015/0185842 A1 | 7/2015 | Picciotto | |
| 2015/0268812 A1 * | 9/2015 | Walline | G06F 1/1686 |
| | | | 715/773 |
| 2017/0153703 A1 * | 6/2017 | Yun | G06F 3/016 |
| 2017/0269688 A1 | 9/2017 | Chan | |
| 2017/0364234 A1 * | 12/2017 | Ligameri | G06F 3/0488 |
| 2018/0074694 A1 | 3/2018 | Lehmann | |
| 2018/0081438 A1 * | 3/2018 | Lehmann | H01L 41/0933 |
| 2018/0081441 A1 * | 3/2018 | Pedder | G06F 3/044 |
| 2018/0307365 A1 * | 10/2018 | Chen | G06F 3/04166 |
| 2019/0073036 A1 | 3/2019 | Bernstein | |
| 2019/0264400 A1 * | 8/2019 | Grimm | E01C 23/00 |

FOREIGN PATENT DOCUMENTS

| | | |
|---|---|---|
| WO | 2004/042685 A2 | 5/2004 |
| WO | 2004/042693 A1 | 5/2004 |

(56) References Cited

FOREIGN PATENT DOCUMENTS

| WO | 2005/057546 A1 | 6/2005 |
| WO | 2011/056752 A1 | 5/2011 |
| WO | 2011/071837 A2 | 6/2011 |

OTHER PUBLICATIONS

Rekimoto, J., et al., "PreSenseII: Bi-directional Touch and Pressure Sensing Interactions with Tactile Feedback," Apr. 2006, 6 pages.
Rekimoto, J. et al., "PreSense: Interaction Techniques for Finger Sensing Input Devices," UIST '03 Vancouver, BC, Canada, Nov. 2003, pp. 203-212, ACM 1-58113-636-6/03/0010.
Holleis, P. et al., "Studying Applications for Touch-Enabled Mobile Phone Keypads," Proceedings of the Second International Conference on Tangible and Embedded Interaction (TEI'08), Feb. 18-20, 2008, Bonn, Germany, pp. 15-18.
Westerman, W. et al., "Multi-Touch: A New Tactile 2-D Gesture Interface for Human-Computer Interaction," Proceedings of the Human Factors and Ergonomics Society 45th Annual Meeting, Oct. 2001, pp. 632-636.

\* cited by examiner

SYSTEM AND METHOD FOR PROCESSING USER INPUT VIA A RECONFIGURABLE HAPTIC INTERFACE ASSEMBLY FOR DISPLAYING A MODIFIED KEYBOARD CONFIGURATION

FIELD OF THE DISCLOSURE

The present disclosure generally relates to a key switch assembly and touchpad assembly of, for example, an information handling system. The present disclosure more specifically relates to the use of piezoelectric sensor and haptic generator elements in a keyboard and touchpad, as well as across a full palm rest of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a keyboard or other input or output devices such as cursor control devices for manual input of information by the user which may have a streamline profile.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
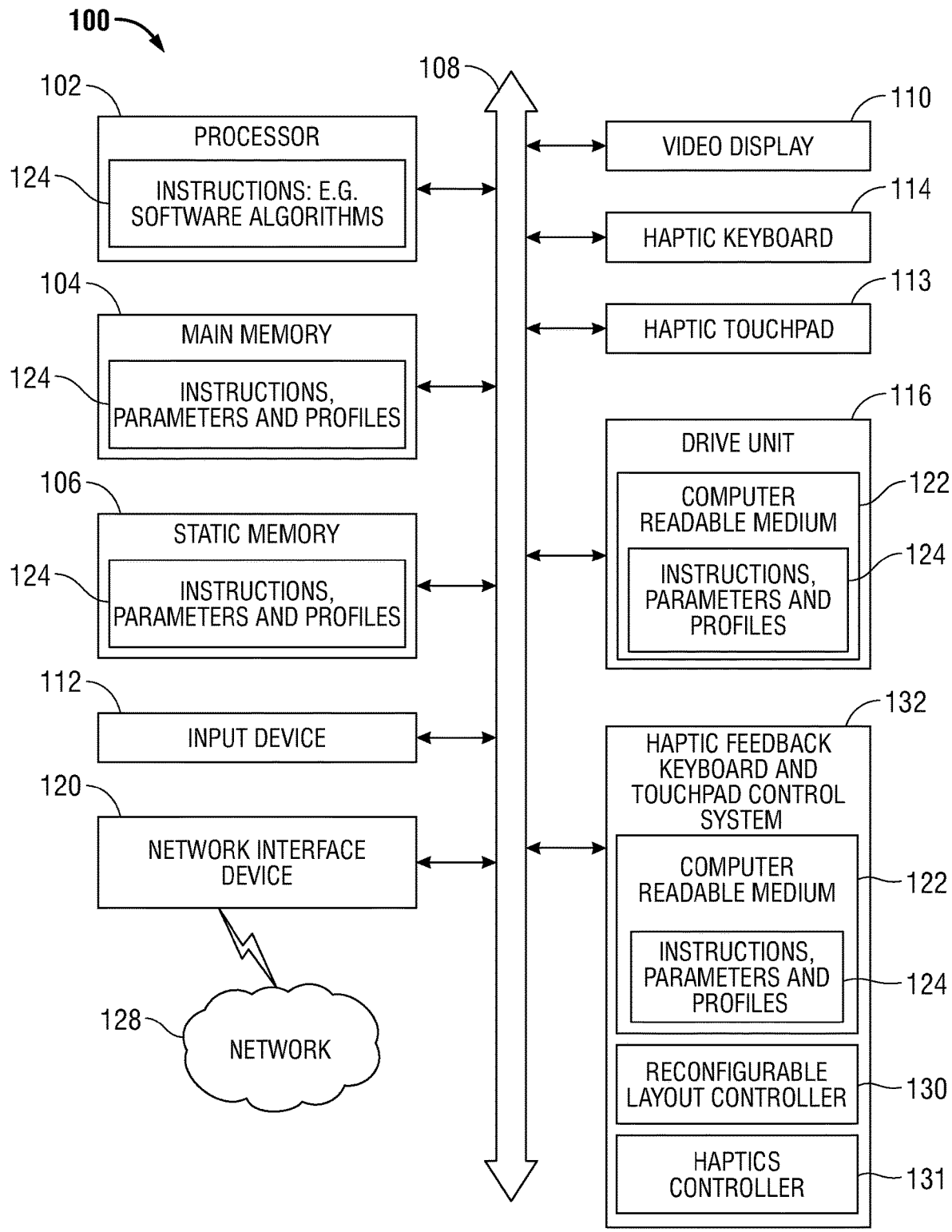
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Traditional C-covers of information handling systems may incorporate a keyboard, touchpad, and palm rest, given in fixed positions within the base chassis of a laptop device. In such traditional layouts, actuation of the keyboard and touchpad is detected by mechanical key assemblies and mechanical touchpad switches, respectively, which may have fixed and immovable positions within the laptop device. In contrast, haptic keyboard assemblies, haptic touchpad assemblies, and haptic palm rest assemblies in embodiments of the present disclosure may each employ either or both a force-sensing element, or piezoelectric elements for detection of such actuation. Because the device sensing actuation of each of these interfaces in embodiments described herein may be of the same type (e.g., force-sensing element, or piezoelectric element, or both), the type of interface (e.g., keyboard, touchpad, palm rest) to which each of these device actuation sensors is assigned may be modified. In other words, a piezoelectric element or force-sensing film at any given location may be assigned to a key of the keyboard, then reassigned at a later time to a portion of the touchpad. Thus, placement of the keyboard, touchpad, and palm rest in embodiments of the present disclosure may be modified, after manufacture of the laptop device, for example, by user input.

Embodiments of the present disclosure provide for a reconfigurable haptic interface assembly of an information handling system capable of displaying modified or user-customized configurations for a keyboard, touchpad, or palm rest, or any combinations of these input surfaces on a coversheet of the C-cover. In order to provide such flexibility in configurations, the reconfigurable haptic interface assembly may be disposed beneath a single coversheet comprising a large portion of the C-cover, to provide capabilities associated with a haptic keyboard, a haptic touchpad, and a haptic palm rest across the entire surface of the coversheet. In other words, the entire coversheet in embodiments described herein may be capable of displaying keys of a keyboard or hot keys of a palm rest, and may be a display system, such as an Organic Light Emitting Diode (OLED) display, capable of sensing a touch location via a capacitive touch layer of a touchpad. In such a way, any portion of the coversheet may be designated for and utilized as a portion of the keyboard, the touchpad, or the palm rest, according to various configurations in embodiments described herein.

The reconfigurable haptic interface assembly may include, in an embodiment, a coversheet to identify an actuation location of an input actuation device (e.g., key of the keyboard, hotkey or multimedia key of the palm rest, or location on the touchpad). The coversheet in embodiments described herein may be combined with an OLED display disposed as a coversheet layer for a C-cover for displaying one or more keys for a keyboard, an area designated for a touchpad, or a palm rest. In some embodiments, the coversheet may further include a force-sensing element disposed underneath the C-cover. The coversheet may serve as an interface layer in some embodiments for a user to actuate the one or more keys, the touchpad area, or to rest palms on the C-cover. Local deformation of the key location of the haptic keyboard, hot keys of the palm rest, or the touchpad area provide for actuation of the key or touchpad of the present embodiments. Such local deformation in an embodiment may be determined when one or both of a force-sensing element disposed under the coversheet of the C-cover or a piezoelectric element disposed between the C-cover and a support plate of the reconfigurable haptic interface assembly detects a downward pressure applied by the user at a location on the coversheet.

The reconfigurable haptic interface assembly may, in embodiments described herein, include a contact foil placed between the coversheet and a support layer. In the embodiments presented herein, the reconfigurable haptic interface assembly may include a piezoelectric element placed between the contact foil and support layer to receive an applied mechanical stress at the actuation location of the input actuation device. The reconfigurable haptic interface assembly of the information handling system, in an embodiment, may include a haptics controller of the information handling system operatively coupled to the contact foil to receive an electric charge in the form of a piezo actuation signal from the piezoelectric element placed under the mechanical stress, and send a haptic feedback control signal to the piezoelectric element, varying in polarity, voltage or current to cause the piezoelectric element to provide haptic feedback at the actuation location.

The coordinates of such an actuation location in embodiments of the present disclosure may be determined through one or more of a plurality of different approaches. In some embodiments, the x- and y-coordinates on the coversheet at which an actuation or touch occurs may be determined based on the known orientation of the piezoelectric elements that are actuated, and these x- and y-coordinates. A user's downward pressure applied at given x- and y-coordinates may actuate a single piezoelectric element, disposed directly beneath those x- and y-coordinates in some scenarios. In other scenarios, a user's downward pressure applied at given x- and y-coordinates may actuate a plurality of piezoelectric elements, each disposed nearby those x- and y-coordinates, in varying degrees, based on the proximity between each of the piezoelectric elements and the x- and y-coordinates. In both of these scenarios, the x- and y-coordinates on the coversheet at which the user applied downward pressure may be determined based on the degree of actuation of one or more piezoelectric elements and a known relationship between each of those one or more piezoelectric elements and all positions across the coversheet of the reconfigurable haptic interface assembly.

In other embodiments, a force-sensing film or a plurality of force-sensing resistors disposed under or within the coversheet may determine the x- and y-coordinates at which a user applied downward pressure. In such embodiments, the downward pressure may be detected either by the force-sensing film or resistors. In still other embodiments, a capacitive touch layer may disposed under the coversheet display and be used by itself or in combination with either a force-sensing element or a piezoelectric element capable of detecting application of downward pressure, to determine the x- and y-coordinates of the user's touch.

The reconfigurable haptic interface assembly may also include or be operably attached to a processor or reconfigurable layout controller capable of associating actuation of the coversheet at determined x- and y-coordinates with a command instruction, based on the current layout of the reconfigurable haptic interface. For example, the reconfigurable layout controller in embodiments of the present disclosure may determine whether the actuation at the determined x- and y-coordinates comprises an actuation of the keyboard, touchpad, or palm rest, based on the configuration of the keyboard, touchpad, or palm rest that was being displayed on the coversheet at the time of the actuation. In such a way, the reconfigurable layout controller in embodiments may correctly associate the user input received via the user's application of downward pressure on a portion of the coversheet as an actuation signal generated at one or more piezoelectric elements. The one or more piezoelectric elements generating actuation signals may be associated with a set of scan codes by the reconfigurable layout controller as instructed by the layout instructions received for a default or selected haptic keyboard and touchpad layout on the top coversheet display. With these scan codes the haptic keyboard and touchpad control system 132 may implement the code instruction the processor will use to execute that user input or instruction. For example, the reconfigurable layout controller may associate actuation at x- and y-coordinates displaying a key of the keyboard with the keyboard scan code associated with that letter or number, which the processor may then execute to register a keystroke event at that key.

The use of keyboard piezoelectric elements or touchpad piezoelectric elements within the keyboard may eliminate the use of other devices such as a scissor mechanism that are used to maintain a keycap of a key above an electrical connection or for a dive board type mechanism under a touchpad. Instead, the keyboard piezoelectric elements or touchpad piezoelectric elements may reduce or eliminate those mechanical elements that may fail after a number of actuations while also reducing the thickness of the keyboard or the touchpad itself. Instead of the keys of the keyboard requiring travel of a scissor mechanism within a C-cover of the information handling system, the relatively thinner keys defined (either physically or visibly) on the solid state keyboard of the presently-described information handling system may reduce the physical thickness of the keyboard within the information handling system. This may enable a thinner, more streamlined information handling system. The overall thickness of the information handling system may be reduced to as to decrease the size and weight of the information handling system. In other embodiments, because the keyboard described herein has a reduced thickness, the space within the information handling system used to house other components, such as a battery, of the information handling system may be increased allowing for the increase in size of these components or the inclusion of additional components within the chassis of the information handling system. Additionally, because the solid state keyboard or touchpad described herein does not include the mechanical components (i.e., scissor mechanism and coupled key cap or dive board mechanism) as other keyboards or touchpads, the keyboard may be less susceptible to wear or mechanical strain over time. Instead, with the implementation of the piezoelectric elements, the solid state keyboard or touchpad of embodiments herein uses fewer mechanical parts and may be more robust resulting in longer usable life.

Turning now to the figures, FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system may include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices, one or more communications ports for communicating with external devices, as well as, various input and output (I/O) devices 112, such as a keyboard 114, a touchpad 113, a mouse, a video/graphic display 110, or any combination thereof including any controller and drivers related thereto. The information handling system 100 may also include one or more buses operable to transmit communications between the various hardware components. Portions of an information handling system 100 may themselves be considered information handling systems 100.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, or other memory of computer readable medium 122 storing instructions 124 of the haptic feedback keyboard and touchpad control system 132, and drive unit 116 (volatile (e.g. random-access memory, etc.), nonvolatile memory (read-only memory, flash memory etc.) or any combination thereof. The haptic feedback keyboard and touchpad control system 132 in an embodiment may also include a reconfigurable layout controller 130 or a haptics controller 131. A haptics controller 131 in an embodiment may perform functions relating to determining an actuation location on a coversheet of a reconfigurable haptic interface assembly. A reconfigurable layout controller 130 in an embodiment may perform functions relating to determining a code instruction or user input information associated with the actuation, at the location determined by the haptics controller 131, based on the configuration displayed by the reconfigurable haptic interface at the time of the actuation and scan codes assigned to supporting piezoelectric elements for characters or functions. The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad 113, or gesture or touch screen input), and a keyboard 114. Various drivers and control electronics may be operatively coupled to operate input devices 112 such as the haptic keyboard 114 and haptic touchpad 113 according to the embodiments described herein.

The network interface device shown as wireless adapter 120 may provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 may be transmitted or received over the network 128 via the network interface device or wireless adapter 120.

The information handling system 100 may include a set of instructions 124 that may be executed to cause the computer system to perform any one or more of the methods or computer-based functions disclosed herein. For example, instructions 124 may execute a haptic feedback keyboard and touchpad control system 132, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the haptic feedback keyboard and touchpad control system 132 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the haptic feedback keyboard and touchpad control system 132 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100.

Main memory 104 may contain computer-readable medium, such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The haptic feedback keyboard and touchpad control system 132 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the haptic feedback keyboard and touchpad control system 132 that may be operably connected to the bus 108. The haptic feedback keyboard and touchpad control system 132 computer readable medium 122 may also contain space for data storage. The haptic feedback keyboard and touchpad control system 132 may, according to the present description, perform tasks related to receiving an electric charge from a piezoelectric element and return a piezo actuation signal to that piezoelectric element causing a haptic feedback at a key or location on a touchpad 113 associated with that piezoelectric element. In these embodiments, the haptic feedback keyboard and touchpad control system 132 may receive an electric charge from any of a plurality of piezoelectric elements each associated with a key on keyboard 114 (i.e., a QWERTY or other top overlay keyboard), a keypad, or a location on a touchpad 113. Input may be received by the haptic feedback keyboard and touchpad control system 132 either simultaneously or concurrently so as to provide a haptic feedback control signal to the corresponding piezoelectric elements as described herein.

The haptic feedback keyboard and touchpad control system 132 may also, according to the present description, perform tasks related reconfiguration of the locations or sizes of the haptic keyboard 114, haptic touchpad 113, or haptic palmrest layout on a top coversheet display of present embodiments. The haptic feedback keyboard and touchpad control system 132 may further perform tasks related to coordination of assigned piezoelectric elements to the default or customized locations or sizes of the haptic keyboard 114, haptic touchpad 113, or haptic palmrest layout on a top coversheet display for actuation detection, assigned scan codes for characters and functions, and for haptic feedback responses in embodiments herein.

In an embodiment, the haptic feedback keyboard and touchpad control system 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
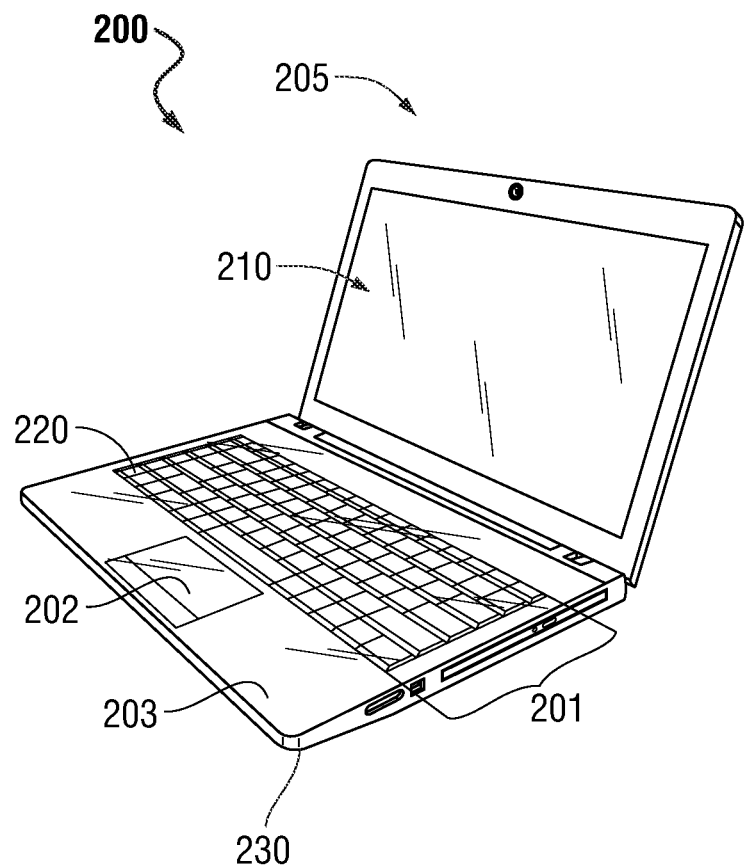
FIG. 2 is a perspective graphical diagram of an information handling system with a haptic feedback control system for a keyboard or touchpad according to an embodiment of the present disclosure.

FIG. 2 is a perspective graphical diagram of an information handling system 200 with a haptic feedback keyboard and touchpad control system 132 according to an embodiment of the present disclosure. Although FIG. 2 depicts the information handling system 200 as being implemented in a laptop computing device, FIG. 2 is not meant to be limiting and the present specification contemplates that the use of other types of information handling system as described herein. In the example, the information handling system may include a screen portion 210 and a reconfigurable haptic interface portion 230 that may further include a keyboard portion 201, touchpad portion 202, and a palm rest portion 203 displayed on a second display screen in a base chassis in an example embodiment. As described herein, the configuration and respective locations of the keyboard portion 201, touchpad portion 202, and palm rest portion 203 may be changed, adapted, or modified following manufacture of the reconfigurable haptic interface portion 230 via changing locations or sizes on the reconfigurable haptic interface portion 230. As such, the positions of the keyboard 201, touchpad 202, and palm rest 203 with respect to one another as displayed on the reconfigurable haptic interface portion 230, and with respect to the display portion 210, as illustrated in FIG. 2, represents only one of several possible such configurations.

The screen portion 210 may include any device that may present to a user any visual data as output to a user in response to input and execution of the instructions, parameters, and profiles 124 by the processor 102 described in connection with FIG. 1. In an example embodiment, a graphical user interface may be presented to a user to input any number of parameters descriptive of the actuation force used to actuate any number of keys 220 on the keyboard portion 201 or palm rest portion 203 of the information handling system, an actuation force at a location on a touchpad 202, or both. The graphical user interface (GUI) may also be used to receive other settings including actuation of a "click" when selecting items on display 210 via a cursor using touchpad 202, setting the force required for actuation, setting multiple-levels of force and operations associated with those levels, and selection of magnitude, pattern, or other characteristics of the haptic response by a key 220 of the keyboard 201 or palm rest 203, or touchpad 202 of the keyboard 201. The GUI may also be displayed on a screen of the reconfigurable haptic interface portion 230 in some embodiments.

The keyboard portion 201 may include any number of keys 220 arranged in any manner so as to receive input from a user via selective actuation of those keys 220. In an embodiment, the keys 220 may be arranged similar to a QWERTY-type keyboard layout or any other alphabetic, symbolic, or numeric layout. In an embodiment, the keys 220 may be any number of keys from 1 to infinity. The keyboard portion 201, touchpad portion 202, and palm rest portion 203 displayed may be of any size or location across the C-cover of the reconfigurable haptic interface portion 230 in embodiments herein. In another embodiment, the keyboard portion 201, the touchpad 202, palm rest 203, and other portion of the C-cover may be made of a single sheet of material as a coversheet of the stack up of the reconfigurable haptic interface assembly as described in systems herein. This single sheet of material may be made of an OLED display. In some other embodiments, portions of the reconfigurable haptic interface portion 230 may be made of metals such as aluminum, titanium, steel or the like or may be made of carbon fiber or plastics to provide for flexible materials. It may also include a force-sensing material, such as a force-sensing film, or a plurality of force-sensing resistors disposed below or within the coversheet in some embodiments. The coversheet in an embodiment may be in whole or in part combined with an OLED display capable of displaying a plurality of available configurations of the keyboard 201, touchpad 202, and palm rests 203. As such, the "keys" 220 of the keyboard 201 or palm rest 203, or boundaries (if any) of the touchpad 202 in some embodiments may be virtual, as displayed by the OLED top layer of the coversheet.

In an embodiment of the present description, each of the keys 220 may be associated with a piezoelectric element or more than one piezoelectric element. The piezoelectric element may be used to, as described herein, create a piezo actuation signal relative to a key 220 on the keyboard portion 201 and send that piezo actuation signal to a controller. In an embodiment, the controller may receive the piezo actuation signal and send a haptic feedback control signal. Upon application of the haptic feedback control signal at the piezoelectric element (i.e., having a specific current and voltage) associated with the actuated key 220 causes the piezoelectric element to convert that piezo actuation signal into a mechanical stress by, for example, warping the piezoelectric element. The mechanical stress of the piezoelectric element due to the application of the haptic feedback control signal to the piezoelectric element may be felt by a user who actuated the key 220 or location on the touchpad 202 as a haptic tactile feedback.

In an embodiment, the touchpad portion 202 may include a touch surface and a capacitive touch layer that indicates a touch location using x- and y-coordinates across the touch surface. In other embodiments, such x, y location determination abilities may be provided instead by, or in conjunction with a force-sensing film disposed below or within the coversheet of the reconfigurable haptic interface portion 230. In an embodiment, an array of piezoelectric elements may be placed under the entire reconfigurable haptic interface portion 230. Each of the piezoelectric elements among the array may detect and respond by providing haptic feedback depending on the piezoelectric elements' proximity to an actuation location across the surface of the coversheet for the reconfigurable haptic interface portion 230. The array of piezoelectric elements activates the actuation location at the reconfigurable haptic interface portion 230 and is a detect/response by one or more nearby piezoelectric elements. The piezoelectric elements create a key actuation movement as haptic feedback (e.g., mimicking a mechanical key actuation) such as when a user actuates a key on the haptic keyboard 201. The piezoelectric elements create a "click" haptic feedback such as when a user selects an item displayed with the haptic touchpad 202.

The information handling system 200 may include a haptic feedback keyboard and touchpad control system 132 as described herein. In an embodiment, the reconfigurable layout controller 130 or the haptics controller 131 may be the same controller that executes instructions, parameter, and profiles 124 to enact the functions of the keyboard 114 and touchpad as described herein. In an embodiment the reconfigurable layout controller 130 and the haptics controller 131 may be the different controllers that each executes instructions, parameter, and profiles 124 to enact the functions of the keyboard 201, touchpad 202, and palm rest 203 as described herein. In an embodiment, the haptic feedback keyboard and touchpad control system 132 may include one or more sets of instructions that, when executed by a haptics controller 131, causes a haptic feedback control signal, at a voltage, to be applied to a piezoelectric element upon detection of a piezo actuation signal from the piezoelectric element. The one or more sets of instructions of the haptic feedback keyboard and touchpad control system 132 may also include one or more sets of instructions that, when executed by the haptics controller 131, determines which of any plurality of keys 220 on a keyboard portion 201 or palm rest 203, or locations on a touchpad 202 were activated. Further, instructions of the haptic feedback keyboard and touchpad control system 132 also implement palm rejection of areas, such as inactive areas of the palmrest, to not register actuation, touch detection, or haptics when not intended at those locations in embodiments herein. For example, a palm rest may be inactive with some software applications such as typing in a word processing program, and may not, therefore, register actuations in an embodiment. The coversheet display OLED may be used to view content, such as videos in some embodiments and those portions operating as a content viewer (e.g., near a haptic keyboard or touch pad) may be rendered inactive and have palm rejection in other embodiments. The reconfigurable layout controller 130 in an embodiment may determine a user input associated with the actuation of the key 220, or the touchpad 202 by identifying a scan code or a user selection associated with the identified actuation location (e.g., key or location on the touchpad) and associated piezoelectric elements, based on the configuration of the keyboard 201, touchpad 202, and palm rest 203 selected and displayed by the OLED layer of the coversheet at the time of actuation.

In an embodiment, the one or more sets of instructions of the haptic feedback keyboard and touchpad control system 132 may also include, in an embodiment, one or more sets of instructions that, when executed by a controller or processor, adjusts the polarity, voltage, or current of haptic feedback control signals applied to any piezoelectric element. This adjustment may be completed based on the desired haptic responses from the piezoelectric elements, the lifespan of the piezoelectric element, the electrical characteristics of the piezoelectric element, the mechanical characteristics of the piezoelectric element, or combinations thereof. Because these characteristics may be different from one piezoelectric element to the other, the piezo actuation signal applied any given piezoelectric element by the haptics controller 131 may be customized to produce a specific level of haptic feedback at any given key. In an embodiment, the haptics controller 131 of the information handling system 200 may include a look-up table. In this embodiment, the haptics controller 131 of the information handling system 200 may access the look-up table in order to determine how a current pulse is to be applied to any given piezoelectric element and at what polarity or voltage of the haptic feedback control signal to the piezoelectric elements.

The one or more sets of instructions of the haptic feedback keyboard and touchpad control system 132 may also include one or more sets of instructions that, when executed by the haptics controller 131, causes any number of subsequent current pulses to be applied to any piezoelectric element. In this embodiment, the subsequent electrical pulses may cause a haptic feedback event to a user who actuated a key 220 on a keyboard portion 201, or a palm rest portion 203 of the information handling system or changes in magnitude or pulses of haptic feedback to emulate the feel of a mechanical keystroke including adjustment of the feel of depth of the haptic-emulated keystroke. In other embodiments, the haptic feedback of the keyboard 201 or palm rest 203 may not need to emulate a keystroke of a mechanically actuated keyboard but instead provide a distinct haptic feel to indicate that a keystroke has occurred on the solid state keyboard 201, or palm rest 203 to the user.

In an embodiment, the one or more sets of instructions of the haptic feedback keyboard and touchpad control system 132 may also include, in an embodiment, one or more sets of instructions that, when executed by a controller or processor, adjusts the voltage and current applied to any piezoelectric element at a touchpad portion 202. This adjustment may be completed based on the desired haptic responses from the piezoelectric elements, the lifespan of the piezoelectric element, the electrical characteristics of the piezoelectric element, the mechanical characteristics of the piezoelectric element, or combinations thereof. Because these characteristics may be different from one piezoelectric element to the other, the piezo actuation signal applied any given piezoelectric element by the haptics controller 131 may be customized to produce a specific level of haptic feedback at any given location across the touchpad. In an embodiment, the haptics controller 131 of the information handling system 200 may include a look-up table. In this embodiment, the haptics controller 131 of the information handling system 200 may access the look-up table in order to determine how a current pulse is to be applied to any given piezoelectric element and at what polarity or voltage of the haptic feedback control signal to the piezoelectric elements.

The one or more sets of instructions of the haptic feedback keyboard and touchpad control system 132 may also include one or more sets of instructions that, when executed by the haptics controller 131, causes any number of subsequent current pulses to be applied to any piezoelectric element. In this embodiment, the subsequent electrical pulses may cause a haptic feedback event to a user who actuated a location across a touchpad portion 202 of the information handling system or changes in magnitude or pulses of haptic feedback to emulate the feel of a mechanical actuation of a touchpad portion 202 including adjustment of the feel of depth or click response of the haptic-emulated actuation of the touchpad portion 202. In other embodiments, the haptic feedback of the touchpad 202 may not need to emulate a click of a mechanically actuated touchpad but instead provide a distinct haptic feel to indicate that a touchpad selection has occurred on the solid state touchpad 202 to the user.

In an embodiment, the application of any current and voltage applied to any of the piezoelectric elements associated with any of the keys 220 or a location on a touchpad portion 202, or palm rest portion 203 may be dependent on an application being executed on the laptop computing device 205. By way of example, a user may be engaged in providing input, via the keys 220 of the keyboard portion 215, to a processor of the laptop computing device 205 in order to cause output to be provided. In a specific embodiment, the laptop computing device 205 may execute a basic input/output system (BIOS). Upon execution of the BIOS, the haptic feedback keyboard and touchpad control system 132 may begin to detect electrical signals or charges emitted from a piezoelectric element being placed in a strain by the actuation of a corresponding key 220 on the keyboard portion 215 or location on a touchpad portion 202. This may allow the haptic feedback keyboard and touchpad control system 132 to receive input at times when the laptop computing device 205 is in an on state. In an alternative embodiment, the execution of other application programs by a processor of the laptop computing device 205 such as word processing application program may trigger the haptic feedback keyboard and touchpad control system 132 to begin to detect the piezo actuation signals produced at any given piezoelectric element. By deferring input received from the piezoelectric element at the haptics controller 131 or any other controller or processor, accidental input may be prevented by any errant touch of the keyboard portion 201, touchpad portion 202, or palm rest portion 203.

Figure 3:
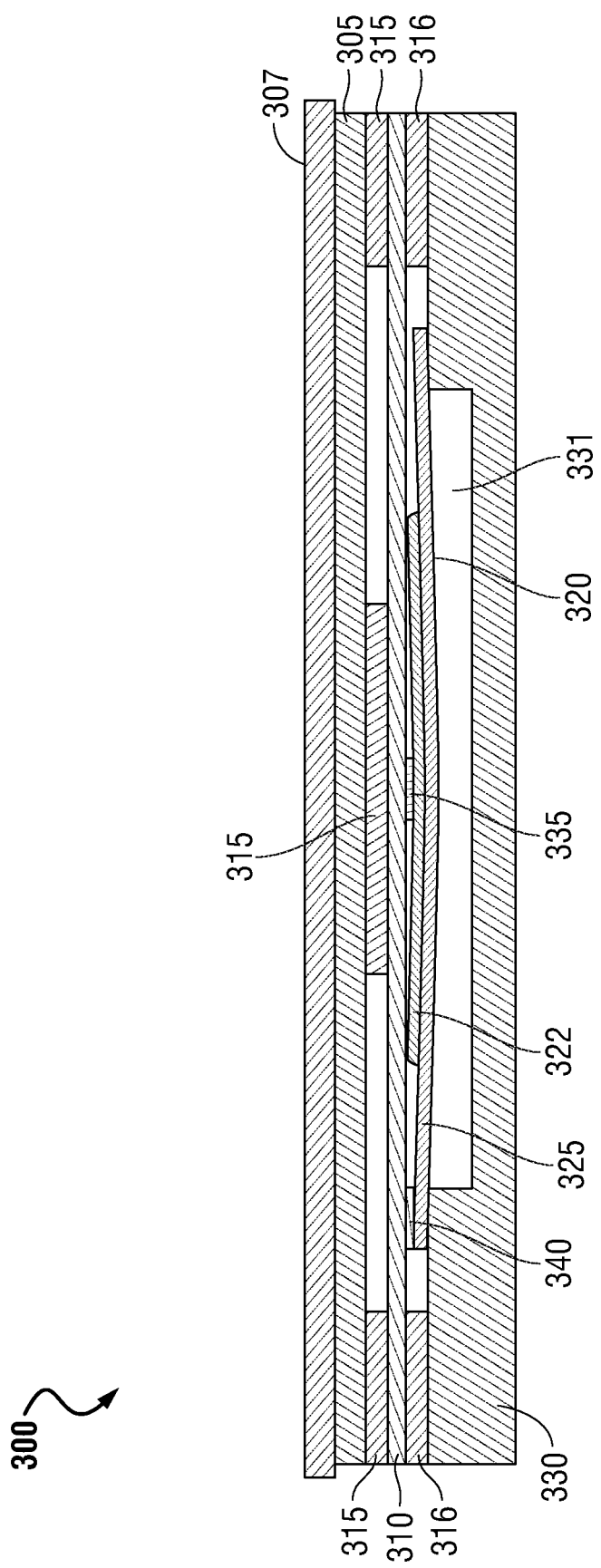
FIG. 3 is a side cut-out view of a portion of a reconfigurable haptic interface assembly implementing a piezoelectric element according to an embodiment of the present disclosure.

FIG. 3 is a side cut-out view of a display surface of a reconfigurable haptic interface assembly implementing a piezoelectric element according to an embodiment of the present disclosure. FIG. 3 depicts a portion 300 of a reconfigurable haptic interface assembly implementing a piezoelectric element 320 in an unactuated state according to an embodiment of the present disclosure. According to an embodiment, the reconfigurable haptic interface assembly may be formed of a plurality of layers, one layer of which is a piezoelectric element 320. The coversheet portion of the reconfigurable haptic interface assembly illustrated in FIG. 3 may include one of a plurality of user interface mechanisms, such as, for example, a keyboard, a palm rest, or a touchpad. Further, the coversheet portion of the reconfigurable haptic interface assembly illustrated in FIG. 3 may incorporate a portion of a first user interface mechanism (e.g., keyboard) in a first configuration (e.g., default configuration), but incorporate a portion of a second user interface mechanism (e.g., touchpad) in a second configuration (e.g., modified configuration). Such a reconfiguration from a default to a modified configuration in an embodiment may be achieved after the manufacture of the reconfigurable haptic interface assembly described herein. FIG. 3 is not intended to be limiting but merely intended as a description of operation of any type of input device contemplated by the present disclosure.

The reconfigurable haptic interface assembly 300 in an embodiment may include a top coversheet display 307. In an embodiment, such a top coversheet display 307 may comprise an organic light emitting diode (OLED), for display of the various user interface mechanisms (e.g., keyboard, touchpad, palm rests) associated with a current haptic interface configuration. The configuration of the keyboard, touchpad, and palm rests in such an embodiment may also be modified, causing the top coversheet display 307 to change the location, size, or orientation of the keyboard, touchpad, or palm rests displayed with respect to one another or with respect to the base chassis of the information handling system. The top coversheet display 307 in an embodiment may comprise a rigid glass surface in some embodiments, and a flexible material, such as a plastic in other embodiments. In some embodiments, a force-sensing element may be incorporated within the top coversheet display 307, such as a force-sensing film or one or more force-sensing resistors. For example, the top coversheet display 307 may be a thin film incorporating a force-sensing resistor, or a Qualisys Track Manager™ thin film. In such embodiments, the force-sensing element may be capable of detecting downward force applied by a user at x- and y-coordinates of the top coversheet display 307.

In embodiments described with reference to FIG. 3, the reconfigurable haptic interface assembly 300 may include the top coversheet display 307. The top coversheet display 307 may be made of any type of elastically resilient material.

The elastically resilient material may allow, at least, a portion of the top coversheet display 307 (e.g., key, portion of the touchpad, portion of the palm rest) to be deformed upon application of a pressure from a user's finger or palm. Upon withdraw of the pressure from the user's finger, the material that the top coversheet display 307 is made of allows the top coversheet display 307 to bend back to its pre-deformed state. In an embodiment, the resilient material may allow the top coversheet display 307 to travel a minimal distance and still deform a piezoelectric element 320. The formation of the reconfigurable haptic interface assembly 300 with the top coversheet display 307 may, in the embodiments presented herein, provide for a keyboard that has a relatively shorter distance of key travel as compared to those keyboards that implement mechanical devices such as a scissor mechanisms and key caps. For example, a distance of between 0.01 mm and 2 mm may be compressed in the stackup including the top coversheet display 307 and piezoelectric element. In an embodiment, the distance is between 0.05 mm and 0.15 mm. In an embodiment, the distance is 0.1 mm. The piezoelectric element 320 may deform between 5 microns and 30 microns in some embodiments. In some embodiments, the top coversheet display 307 may be a or incorporate a force-sensing element, such as a force-sensing film or one or more force-sensing resistors. For example, the top coversheet display 307 may incorporate a thin film incorporating a force-sensing resistor in some embodiments. For example, a thin layer of a force-sensing material, such as, for example, a thin film incorporating a force-sensing resistor may be used in or under the top coversheet display 307. The thin film force-sensing material may include examples such as a quantum tunneling composite thin film or force sensing resistor thin film in some embodiments to enhance or ensure force level detection in some embodiments. One example may be a Qualisys Track Manager™ thin film. The top coversheet display 307 may be adhered into the remaining layers within the assembly 300 as described herein.

In embodiments described with reference to FIG. 3, the reconfigurable haptic interface assembly 300 may include a capacitive touch layer 305. The capacitive touch layer may, in some embodiments be included as part of a reinforcement layer for the top coversheet display 307 which may be an OLED layer. The capacitive touch layer 305 may comprise also reinforcement member a made of a rigid material such as a glass, biaxially-oriented polyethylene terephthalate (Bo-PET) such as Mylar® produced by DUPONT®, a glass-reinforced epoxy such as FR4, or metal. The capacitive touch layer 305 may not be included but instead only a reinforcement layer may be implemented in some embodiments where x, y location detection is conduced via another method. The capacitive touch layer 305, which may be explained in greater detail with respect to FIG. 4, may include a grid of drive and sense lines to determine x- and y-touch locations on the top coversheet display 307 by a user In some embodiments, the capacitive touch layer 305 or reinforcement layer may include the thin layer of a force-sensing material instead above, within or under layer 305. As described, the thin film force-sensing resistor layer may include a quantum tunneling composite thin film or force sensing resistor thin film in some embodiments to enhance or ensure force level detection.

In embodiments described with reference to FIG. 3, the reconfigurable haptic interface assembly may further include a number of adhesive layers that physically couple the various layers of the assembly 300 together. The capacitive touch layer 305 and any thin film force sensing layer may be adhered to the top coversheet display layer 307. In an embodiment, an adhesive layer 315 may be formed on the capacitive touch layer 305 and reinforcement layer to adhere the capacitive touch and reinforcement layer 305 to a contact foil 310. The adhesive layer 315 may include the placement of the adhesive at locations that may enhance the movement and prevent the hindrance of the actuation of the coversheet 305. In a specific embodiment, the adhesive layer 315 may include placing the adhesive along borders of the capacitive touch layer 305, or even the top coversheet display layer 307, as well as placing the adhesive at a central location of the piezoelectric element 320.

The contact foil 310 adhered to the capacitive touch layer 305 in embodiments via the first layer of adhesive 315 may be made of any elastically resilient material that, when the capacitive touch layer 305 or top coversheet display 307 is actuated or the contact foil 310 is bent towards a lower portion of the assembly 300, returns to its original state when the portion of the assembly 300 including the piezoelectric element 320 is no longer being actuated. The contact foil is a flexible material, such as polyethylene terephthalate (PET) serving as a polyester printed circuit board or other type of flexible printed circuit board, in several example embodiments. The contact foil 310 may include a number of metal traces formed thereon that electrically and communicatively couple each of the corresponding piezoelectric element 320 of the reconfigurable haptic interface assembly 300 to a controller such as a controller or processor of an information handling system that includes a haptic feedback keyboard and touchpad control system such as described herein. Formation of metal traces may be made according to a variety of methods including photolithographic techniques for applying metal or lamination of copper strips or other metal layers. During operation of the assembly 300, the contact foil 310 may receive a piezo actuation signal from the piezoelectric element 320 at the metal traces that conduct the piezo actuation signal to the controller or processor associated with the reconfigurable haptic interface assembly 300. The metal traces formed on the contact foil 310 may further be used to conduct a haptic feedback control signal from the controller to the piezoelectric element 320 so that the voltage and current of the haptic feedback control signal may cause the piezoelectric element 320 to warp upward and downward before returning to a planar and rigid form of the piezoelectric element 320 as would be required to cause a specified haptic feedback to the user via capacitive touch layer 305 and top coversheet display 307. This actuation causing warping of the piezoelectric element 320 may cause a haptic feedback presented at the top coversheet display 307 via the contact foil 310, adhesive 315, and capacitive touch layer 305 that the user may feel. This haptic feedback may be relayed to the user within microseconds of the user actuating the top coversheet display 307 such that the user physically detects a sensation that the top coversheet display 307 was pressed. This sensation felt by the user may be present despite no actual mechanical devices such as a scissor mechanism or other types of keyboard mechanical devices being present among the layers of the reconfigurable haptic interface assembly 300. The signal to the piezoelectric element 320 may vary in magnitude and pulsing to create the desired haptic response at reconfigurable haptic interface assembly 300. In an embodiment, portions of the contact foil 310 may be physically coupled to a support plate 330 via a second layer of adhesive 316. The location of the placement of the second adhesive layer 316 may include placing the adhesive along borders of the force-sensing surface 300 (e.g., key, touchpad, or palm rest). As described, various adhesive layers may be used to adhere any of the functional layers of the reconfigurable haptic interface assembly in any order and some layers may not be utilized in various embodiments herein.

In an embodiment, the piezoelectric element 320 may include a first portion 322 that may be any solid piezoelectric material that accumulates an electric charge when a mechanical stress is applied to it or specifically, in the embodiments presented herein, when the solid material is deformed. Solid materials used to form the piezoelectric element 320 may include crystals, ceramics, or protein layers, among other types of materials. For ease of explanation, the piezoelectric element 320 may be made of a type of ceramic although the present specification contemplates the use of other types of piezoelectric materials.

The piezoelectric element 320 may be housed over a cavity 331 formed in the support plate 330. The piezoelectric element 320 may comprise two portions 322 and 325 each electrically coupled via electric contact points such as soldering points 335 and 340, respectively, to a different electrical trace on a contact foil 310. The first portion 322 may be a ceramic disc in an embodiment. Second portion 325 of the piezoelectric element 320 may be a metal plate or ring, such as a brass plate, that extends beyond the edges of cavity 331. The first portion 322 and the second portion 325 may be operatively coupled via adhesive including conductive adhesives. The soldering points 335 and 340 may be silver solder contact points for operative electrical coupling to metal traces on contact foil 310. The brass plate 325 supports deflection of the piezoelectric element 320 into the cavity 331 to detect mechanical actuation of the force-sensing surface 300 (e.g., key). In an embodiment, the support plate 330 may have cavity 331 formed therein such that the piezoelectric element 320 may be allowed to be deflected therein when the reconfigurable haptic interface assembly 300 is actuated by a user and cavity 331 may be an aperture or hole through support plate 330 or may be a depression or hole in support plate 330 that does not pass through support plate 330.

The piezoelectric element 320 may be electrically and communicatively coupled to the metal traces formed on the contact foil 310 via metallic connection points 335 and 340 such as a solder dot. In a specific embodiment, the piezoelectric element 320 may be electrically and communicatively coupled at a first portion 322 to a metallic trace formed on the contact foil 310 by a first soldering point 335 and at a second portion 325 to a metallic trace in contact foil 310 via a second soldering point 340. The soldering points 335 and 340 may be silver contact points for making electrical contact to first portion 322 and second portion 325 of the piezoelectric element 320. As so oriented, the first soldering point 335 and second soldering point 340 may be formed to receive a piezo actuation signal upon deflection of the piezoelectric element 320 as a user actuates the reconfigurable haptic interface assembly 300 and the electrical charge accumulates at the piezoelectric element 320. As described herein, the piezo actuation signal may be detected by the haptics controller as received from the electrically conductive metal traces and portions 322 and 325.

Upon receiving a piezo actuation signal, the haptics controller sends a haptic feedback control signal back to the piezoelectric element 320 via the metal traces formed on the contact foil 310, through the soldering points 335 and 340 and to a conductive layer of metallic plate or ring 325 formed below the piezoelectric disk material 322. The conductive layer of metallic plate or ring 325 may apply the haptic feedback control signal to the piezoelectric disk material 322 so as to cause the piezoelectric disk material 322 to stretch or shrink depending on the polarity of the signal applied. For example, a negative voltage haptic feedback control signal applied to piezoelectric disk material element 322 relative to the charge at adhesively attached metallic plate 325 may cause piezoelectric disk 322 to expand or stretch in embodiments herein. This may cause metallic plate 325 to warp downward. Reversing polarity to the piezoelectric disk 322 may cause the piezoelectric disk 322 to compress or shrink and metallic plate 325 may warp upwards. The principle of haptics applied to the piezoelectric disk 322 includes an input voltage as applied through the two electrodes (voltage change as sine wave, square wave etc.) to generate movement on piezoelectric material 322 of the piezoelectric element 320 and a warping of the metallic layer or disk 325. This haptic feedback control signal is used to cause a haptic tactile feedback such as a depression and return of the top coversheet display 307 or a haptic "click" of a touchpad and which may be accompanied by a sound. Such a haptic feedback control signal, such as a sine wave signal, or other haptic feedback control signal with varying polarities or voltage and current may be used by the controller to create the haptic feedback felt by the user as described herein. In these embodiments, the electric charge sent from the piezoelectric element 320 to the haptics controller and the electrical signal sent from the haptics controller to the piezoelectric element 320 may propagate along the two metal traces formed on the contact foil 310. The contact foil 310 may therefore, in an embodiment, include double the number of metal traces as that of the number of piezoelectric elements 320 used to form a keyboard that includes multiple keys 300 or multiple portions of the touchpad or palm rest.

The formation of the reconfigurable haptic interface assembly 300 may, in the embodiments presented herein, provide for a keyboard that has a relatively shorter distance of key travel as compared to those keyboards that implement mechanical devices such as a scissor mechanisms and key caps. In an embodiment, the distance of travel of the actuated portion of the top coversheet display 307 may be smaller than 0.1 mm. With the shorter distance of key travel, the overall thickness of the keyboard placed within an information handling system may be reduced. Similarly, formation of the reconfigurable haptic interface assembly 300 may, in the embodiments presented herein, provide for a touchpad that is relatively thinner as compared to those touchpads that implement linear resonance magnet devices to deliver haptic feedback, as linear resonance magnet devices tend to be thicker than piezoelectric element haptic feedback stacks. This increases the available footprint within a base chassis of, for example, a notebook-type information handling system that may be used for more or larger components (e.g., batteries) to be placed within the base chassis. Additionally, or alternatively, the reduction in thickness of the keyboard, touchpad, and palm rest may reduce the overall thickness of the information handling system improving the aesthetics of the design of the information handling system. This reduction in size of the information handling system may also result in the reduction of the weight of the information handling system thereby increasing the portability of the information handling system by the user.

The keyboard, touchpad, and palm rests in embodiments described herein also include no moving mechanical parts. With the absence of mechanical moving parts, the reconfigurable haptics interface assembly of such an embodiment may be relatively more robust, thereby increasing the useful life of the reconfigurable haptic interface assembly 300. This may increase user satisfaction over the useful lifetime of the information handling system.

Figure 4:
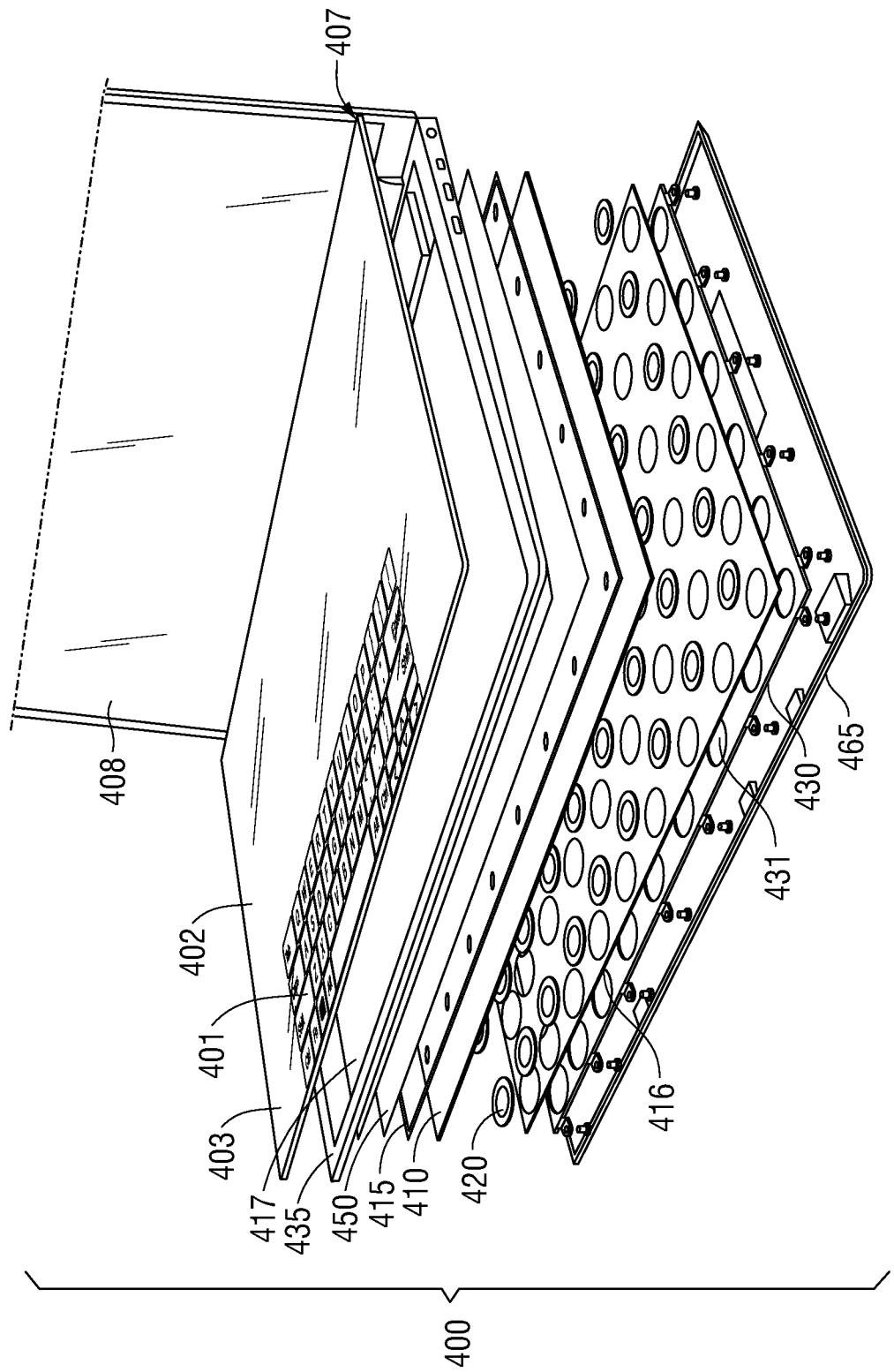
FIG. 4 is an exploded perspective view of a reconfigurable haptic interface assembly of an information handling system according to an embodiment of the present disclosure.

FIG. 4 is an exploded perspective view of a reconfigurable haptic interface assembly 400 stack up of an information handling system according to an embodiment of the present disclosure. The reconfigurable haptic interface assembly includes a top coversheet display 407 for displaying a keyboard 401, palm rest 403, or touchpad 402 surface according to various configurations. In an embodiment, the entire top coversheet display 407 surface of the reconfigurable haptic interface assembly 400 may provide haptic force sensing and haptic feedback capabilities.

The keyboard 401 in an embodiment shows a plurality of keys, arranged so as to receive input from a user at multiple keys. FIG. 4 also shows a top coversheet display 407 displaying a touchpad 402 and palm rest 403. In an embodiment, the keys may be arranged similar to a QWERTY design of a keyboard 401. However, other arrangements of any alphabetic, numeric, or symbolic keys is contemplated by the present description. As described herein, the top coversheet display 407 may display the keyboard 401, touchpad 402, and palm rests 403 in varying sizes, locations, and orientations with respect to one another, and with respect to the display chassis 408, based on a currently implemented configuration. The top coversheet display 407 in an embodiment may be an OLED display and may form a monolithic piece that, for example, includes different polycarbonate-acrylonitrile butadiene styrene (PC-ABS) resins, and may have glass or another transparent material used with OLED displays as a top layer in some embodiments.

In some embodiments, the top coversheet display 407 may be made of any type of elastically resilient material. The elastically resilient material may allow, at least, a portion of the top coversheet display 407 to be deformed upon application of a pressure from a user's finger. Upon withdraw of the pressure from the user's finger, the material the top coversheet display 407 is made of allows the portion of the top coversheet display 407 displaying the key 401, the touchpad 402, or the palm rest 403 to bend back to its pre-deformed form. In an embodiment, the resilient material may allow the top coversheet display 407 to travel a distance of between 0.01 mm and 2 mm. An adhesive or mechanical attachment may be used to adhere the top coversheet display 407 to the C-cover substructure 435 and remaining layers of the reconfigurable haptic interface assembly.

The reconfigurable haptic interface assembly 400 may further include a C-cover substructure 435 forming part of the base chassis with a cutout for the top coversheet display 407. In an embodiment, the top coversheet display 407 is an OLED incorporated within a material such as a glass or plastic. The top coversheet display 407 may further incorporate a force-sensing material. In some embodiments, force-sensing layer is a thin film disposed directly beneath the top coversheet display 407 may comprise a force-sensing material, as described with reference to FIG. 3. The top coversheet display 407 may be attached to a remaining portion of the C-cover substructure 435 through a bonding process or via metal inserts attached to the top coversheet display 407 and connected to the C-cover substructure 435 through a number of fastening devices. In an embodiment, the C-cover substructure 435 may be made of a rigid material that allows little or no movement. The rigidity of the C-cover substructure 435 allows the other layers within the reconfigurable haptic interface assembly 400 to be maintained within the information handling system. In an embodiment, the C-cover substructure 435 may be made of a metal.

The reconfigurable haptic interface assembly 400, in an embodiment, may further include any number of adhesive layers (e.g., 415, 416, and 417) to bond any or all of the functional layers described in the variety of embodiments of the reconfigurable haptic interface assembly of embodiments herein. In an embodiment, a first adhesive layer 417 disposed beneath the top coversheet display 407 may operatively couple the top coversheet display 407 to a reinforcement member 450 that may provide structural support and may be situated beneath the top coversheet display 407. In some embodiments, the reinforcement member may comprise a capacitive touch layer. The capacitive touch layer formed on the reinforcement member 450 in such an embodiment may be made of a rigid material such as a glass, biaxially-oriented polyethylene terephthalate (BoPET) such as Mylar® produced by DUPONT®, or a glass-reinforced epoxy such as FR4. Such a capacitive touch layer may include a grid of drive and sense lines to determine x- and y-touch locations touched on the top coversheet display 407 by a user. The capacitive touch layer and reinforcement layer 450 may include a grid of indium tin oxide (ITO) or other drive and sense lines that may detect capacitance changes at the x, y touch location according to embodiments herein. The capacitive touch layer may be implemented within the OLED top coversheet layer 407 or may be disposed on another layer such as the contact foil layer 410 in other embodiments. The capacitive touch layer may be operatively coupled to a capacitive touch controller (not shown) in some embodiments to control and detect operation of the grid of sense and drive lines. In another aspect of an embodiment, a second adhesive layer 415 may mechanically couple the reinforcement layer or capacitive touch layer 450 to a contact foil layer 410.

The first, second, and third adhesive layers 415, 416, and 417 may include the placement of the adhesive at locations that may enhance the movement and prevent the hindrance of the actuation of the top coversheet display 407. In a specific embodiment, the second adhesive layer 415 may include placing the adhesive along borders of each of the piezoelectric elements 420 as well as placing the adhesive at a central location of each of the piezoelectric elements 420. In another embodiment, the first adhesive layer 417 may include placing the adhesive uniformly across the surface of the reinforcement/capacitive touch member 450. In still another embodiment, the third adhesive layer 416 may include placing the adhesive in locations correlating to locations of the piezoelectric elements 420 situated beneath the contact foil 410.

The contact foil layer 410 may be made of any elastically resilient material that, when any given piezoelectric element 420 is actuated or the contact foil layer 410 is bent towards a lower portion of the assembly 400, returns to its original state when the piezoelectric element 420 is no longer being actuated. The contact foil layer 410 may include a number of metal traces formed thereon that electrically and communicatively couples each of the piezoelectric elements 420 to a haptic controller of an information handling system that includes a haptic feedback keyboard control system such as described in connection with FIG. 1. In an embodiment, the haptic controller may be a dedicated controller communicatively coupled to the contact foil layer 410 so as to detect piezo actuation signals from each of the piezoelectric elements 420 and provide haptic feedback control signals back to the respective piezoelectric elements 420. In embodiments herein, the haptic feedback keyboard and touchpad control system may operate a reconfigurable layout controller that, among other computations and execution of other computer readable code, also executes computer readable program code to modify size, location, and operation for reconfigured layouts for the haptic keyboard 402, haptic touchpad 401, and haptic palm rest 403. The haptic feedback keyboard and touchpad control system may operate the reconfigurable layout controller also modify operation of the reconfigurable haptic interface assembly 400, including the array of piezoelectric elements, for operating under the new locations and sizes when reconfigured. In an alternative embodiment, some or all of the haptic controller may operate on a processor of the information handling system.

During operation of the top coversheet display 407, the contact foil layer 410 may receive a piezo actuation signal from the piezoelectric elements 420 as they are compressed. Upon actuation, the metal traces may conduct the piezo actuation signal to the haptic controller associated with the reconfigurable haptic interface assembly 400. The metal traces formed on the contact foil layer 410 may further be used to conduct a return haptic feedback control signal from the haptic controller to the piezoelectric elements 420 so that the voltage and current of the haptic feedback control signal may cause the piezoelectric elements 420 to stretch or contract in response to a haptic feedback control signal and at varying polarities, voltages, or currents. This haptic feedback control signal to of each of the actuated piezoelectric elements 420 may cause a haptic feedback presented at various locations across the top coversheet display 407 that the user may feel. This haptic feedback may be relayed to the user within microseconds of the user actuating any portion of the top coversheet display 407 such that the user physically detects a sensation that the touchpad was clicked or pressed down intentionally. The individual piezoelectric elements 420 in an embodiment may cooperate within the array to create this haptic feedback felt by the user at the top coversheet display 407, as described in greater detail with respect to FIGS. 5 and 6.

In some specific embodiments, the location of actuation by the user may be detected by the capacitive touch layer (e.g. within the reinforcement member or layer 450), or by a force- sensing material (e.g., force-sensing film or a plurality of force-sensing resistors) disposed atop, within, or beneath the reinforcement member or layer 450 to indicate to the haptics controller which piezoelectric elements 420 should receive a haptic feedback control signal. For example, in some embodiments, a force-sensing material may detect downward pressure applied by a user at known x- and y- coordinates of the top coversheet display 407, and may transmit a notification of such an actuation, as well as the x- and y- coordinates to the haptic controller, which may be operably attached to the force-sensing material (e.g., via electrically conductive pathways). In another example, and in another aspect of an embodiment, a capacitive touch layer 450 may determine x- and y- coordinates of the top coversheet display 407 at which a user has made contact, and may transmit those x- and y- coordinates to the haptic controller, which may be operably attached to the force-sensing material (e.g., via electrically conductive pathways). Such a capacitive touch layer within a reinforcement member or layer 450, piezoelectric elements 420, and force-sensing material may be used alone, or in various combinations with one another, according to various embodiments described herein, to detect actuation of some portion of the reconfigurable haptic interface (e.g., keyboard, touchpad, or palm rest) displayed on the top coversheet display 407.

The reconfigurable haptic interface assembly 400 may further include a third adhesive layer 416 that mechanically couples the contact foil layer 410 to a support plate 430. In an embodiment, the third adhesive layer 416 may include the placement of an adhesive along borders of each piezoelectric element 420. As shown in FIG. 4, the third adhesive layer 416 includes circular voids that conform to a shape of each piezoelectric element 420.

The support plate 430 may be made of rigid material, such as a metal, and may prevent deformation of the combination stack up except for, in some embodiments, the contact foil layer 410, piezoelectric elements 420, first adhesive layer 417, second adhesive layer 415, and third adhesive layer 416, and for operation of the haptic keys. As such, the contact foil layer 410 may be allowed to detect the deformation of the piezoelectric elements 420. Additionally, a user using the reconfigurable haptic interfaces (e.g., keyboard, touchpad, or palm rest) displayed by the top coversheet display 407 may feel a level of rigidity in the top coversheet display 407 except at the locations where the user has expected that some level of deformation occurs when pressure is applied to provide for key or touchpad actuation of the piezoelectric elements 420.

In an embodiment, the support plate 430 may include a number of cavities 431 formed therein. The cavities 431 may be sized to have a relatively smaller diameter than the diameter of each of the respective piezoelectric elements 420. By including these cavities 431, the piezoelectric elements 420 may be allowed to be deformed into the cavities 431 so that the deformation of the piezoelectric element 420 creates the piezo actuation signals described herein. The metal plate of the piezoelectric elements 420 may have a diameter greater than cavities 431. Upon compression or contraction of the piezoelectric material portions, such as a ceramic disk of the piezoelectric element 420, the metal plate may warp into or away from the cavity 431. The depth of the cavities 431 may also be selected to allow for at least a central portion of each piezoelectric element 420 to be deflected into the cavities 431 some distance. This distance of deflection, in an embodiment, may be 0.1 mm or smaller or may be greater. In an embodiment, the cavities 431 may also be holes punched or machined through the support plate 430.

In an embodiment, the support plate 430 may be secured to other rigid elements of the information handling system. In an embodiment, the support plate 430 may be secured to the C-cover substructure 435 via a number of bolts, screws, or other mechanical or chemical coupling device. In some embodiments, the support plate 430 may be operatively coupled to the D-cover 465 of the information handling system.

Each of the piezoelectric elements 420 may include a first portion layer of piezoelectric material and a second portion conductive layer as described herein in connection with the larger figures describing the keys in FIG. 3. Additionally, each piezoelectric element 420 may be operatively coupled to at least one metal trace formed on the keyboard contact foil layer 410, via a contact point such as a solder point. In this embodiment, the conductive layer associated with each of the piezoelectric materials of the piezoelectric elements 420 may be operatively coupled to at least one metal trace formed on the contact foil layer 410 via a contact point such as a solder point. The contact foil layer 410 may, in a particular embodiment, include two metal traces for each piezoelectric element 420 at a first portion and a second portion.

During operation of the top coversheet display 407, a user may actuate a location having x- and y-coordinates on the top coversheet display 407 by pressing down at that location. As a result of the mechanical stress placed on the piezoelectric material of one or more piezoelectric elements 420 disposed directly beneath or nearby that location on the top coversheet display 407, an electric charge (e.g., piezo actuation signal) is created at the one or more piezoelectric elements 420. The piezo actuation signal is carried to one or more metal traces coupled to the piezoelectric material and the metal plate of the piezoelectric element 420 via a contact point such as a solder point. The electric charge received at the one or more metal traces may be conducted to a haptic controller by the metal trace as described herein.

In this embodiment, the haptic controller may detect that piezo actuation signal produced by the mechanical stress of the piezoelectric material of the piezoelectric element 420 and send an electrical signal (e.g., haptic feedback control signal) back to the piezoelectric material of the piezoelectric element 420. This haptic feedback control signal may have a certain voltage, current, and polarity (−, +) sufficient to render the piezoelectric material of the piezoelectric element 420 to cause a haptic feedback or sound. The haptic feedback control signal from the haptic controller may follow the same or a different metal trace back to the piezoelectric element 420. The haptic feedback control signal may be received at the piezoelectric material and metal plate of the piezoelectric element 420 via, for example, a contact point such as a solder point. Because the piezoelectric material of the piezoelectric element 420 receives the haptic feedback control signal from the haptic controller, this causes the piezoelectric material to generate a haptic feedback. A haptic feedback control signal may be a sine wave, a square wave, a pulsed signal, or other waveform of changing current, voltage, or polarity applied to the piezoelectric element 420. As a result of the piezoelectric material stretching or contracting during the haptic feedback, the piezoelectric element 420 may warp downward or upward with respect to the cavity 431 and may return back to a non-deformed state, thereby creating haptic feedback felt by the user's finger. In an embodiment, the relay of the piezo actuation signal to the haptic controller, the detection of the haptic controller of the piezo actuation signal, and the return of the haptic feedback control signal by the haptic controller to the piezoelectric element 420 may be sufficiently quick enough for the user to feel the haptic feedback in a manner that the user does not detect any temporal delay between the actuation of the top coversheet display 407 and the detection of the haptic feedback created at the piezoelectric element 420. In an embodiment, the relay of the piezo actuation signal to the haptic controller, the detection of the haptic controller of the piezo actuation signal, and the return of the haptic feedback control signal by the haptic controller to the piezoelectric element 420 may be on the order of microseconds. This operation may be conducted every time the user actuates any portion of the top coversheet display 407 in an embodiment.

Figure 5:
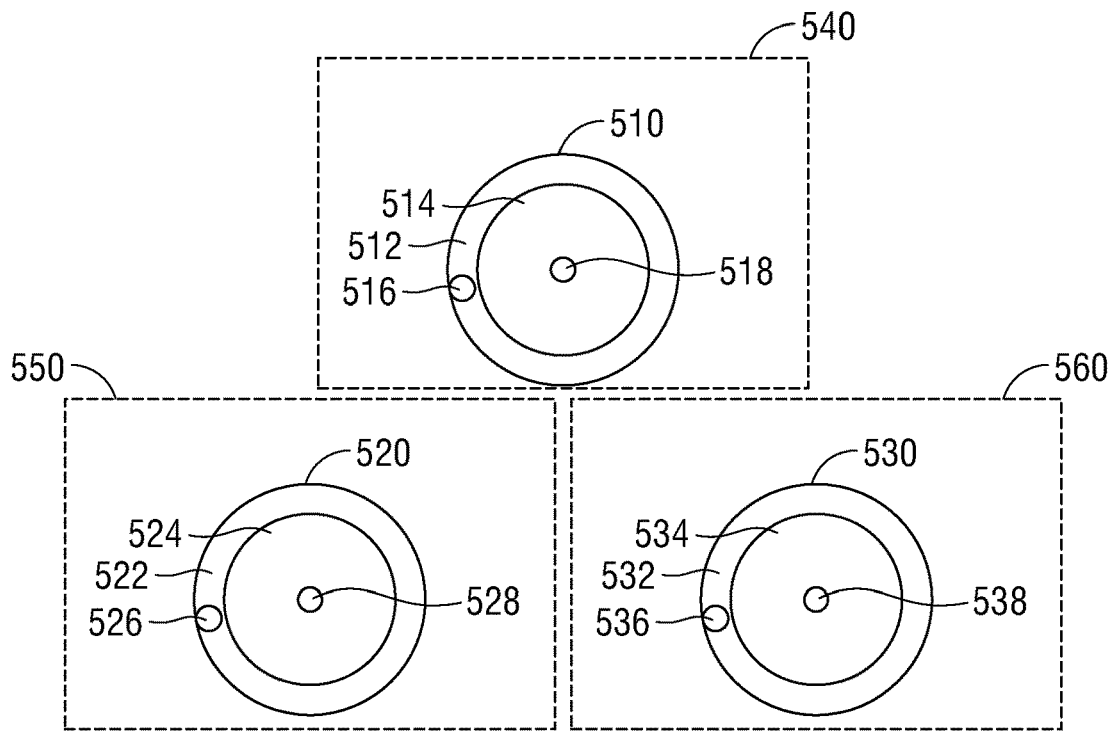
FIG. 5 is a graphical diagram illustrating an array of piezoelectric elements and virtual keys in a first configuration according to an embodiment of the present disclosure.

FIG. 5 is a graphical diagram illustrating an array of piezoelectric elements and virtual keys in a first configuration, where each piezoelectric element is situated directly beneath a single virtual key according to an embodiment of the present disclosure. As described herein, a user's downward pressure applied at given x- and y-coordinates on the top coversheet display in an embodiment may actuate a single piezoelectric element, disposed directly beneath those x- and y-coordinates in some scenarios. For example, in an embodiment illustrated in FIG. 5, each of the piezoelectric elements 510, 520, and 530 may be situated directly beneath a virtual key 540, 550, and 560 displayed via the top coversheet display, respectively. In such an embodiment, the orientation or location of each of the piezoelectric elements 510, 520, and 530 with respect to the dimensions of the top overlay layer may be known, such that an actuation detected at any of the piezoelectric elements 510, 520, or 530 may be associated with x- and y-coordinates for the actuation location on the top coversheet display.

As described herein, as a result of the mechanical stress placed on the piezoelectric material of one or more piezoelectric elements, an electric charge (e.g., piezo actuation signal) is created, and is carried to one or more metal traces coupled to the piezoelectric material and the metal plate of the piezoelectric element via solder points. The electric charge received at the one or more metal traces may be conducted to a haptic controller by the metal trace as described herein. For example, as a result of the mechanical stress placed on the ceramic material 514 of piezoelectric element 510, a piezo actuation signal may be generated and carried to metal traces coupled to the ceramic portion 514 at solder point 518, and the metal plate 512 at solder point 516.

The haptic controller in an embodiment may detect that piezo actuation signal produced by the mechanical stress of the piezoelectric material 514 of the piezoelectric element 510 and send an electrical signal (e.g., haptic feedback control signal) back to the piezoelectric material 514 of the piezoelectric element 510. This haptic feedback control signal may have a certain voltage, current, and polarity (−, +) sufficient to render the piezoelectric material 514 of the piezoelectric element 510 to cause a haptic feedback or sound. The haptic feedback control signal from the haptic controller may follow the same or a different metal trace back to the piezoelectric element 510. A haptic feedback control signal may be a sine wave, a square wave, a pulsed signal, or other waveform of changing current, voltage, or polarity applied to the piezoelectric element 510. As a result of the piezoelectric material 514 stretching or contracting during the haptic feedback, the piezoelectric element 510 may warp downward or upward and may return back to a non-deformed state, thereby creating haptic feedback felt by the user's finger at the top coversheet display displaying virtual key 540.

Figure 6:
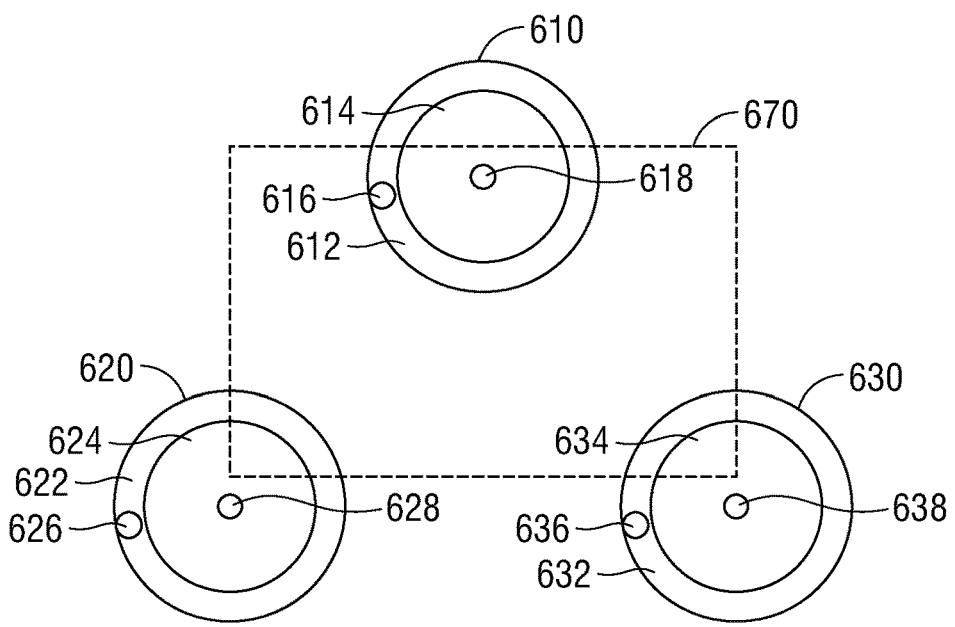
FIG. 6 is a graphical diagram illustrating an array of piezoelectric elements and a virtual key in a second configuration according to an embodiment of the present disclosure.

FIG. 6 is a graphical diagram illustrating an array of piezoelectric elements and a virtual key in a second configuration, where each piezoelectric element is situated partially beneath the single virtual key according to an embodiment of the present disclosure. As described herein, a user's downward pressure applied at given x- and y-coordinates of the top coversheet display in an embodiment may actuate a plurality of piezoelectric elements, each disposed nearby or partially beneath those x- and y-coordinates, in varying degrees, based on the proximity between each of the piezoelectric elements and the x- and y-coordinates of the actuation location. For example, in an embodiment described with reference to FIG. 6, each of the piezoelectric elements 610, 620, and 630 may be placed partially, but not wholly, beneath a single virtual key 670 displayed via the top coversheet display. In such an embodiment, as the user applies downward pressure on the single virtual key 670 at the top coversheet display, this may cause partial deflection of the ceramic portions of each of the piezoelectric elements 610, 620, and 630, respectively. For example, the ceramic portion 614 of piezoelectric element 610 may deflect downward 60%, while the ceramic portion 624 of piezoelectric element 620 deflects downward 30%, and the ceramic portion 634 of piezoelectric element 630 deflects downward 20%. The varying degrees to which each of the respective ceramic portions 614, 624, and 634 deflect may be due to the distance between each of the piezoelectric elements 610, 620, and 630, and the center of the virtual key 670 in an embodiment. For example, piezoelectric element 610 may deflect downward to a greater degree (e.g., 60%) than the deflections of piezoelectric elements 620 (e.g., 30%) and 630 (e.g., 20%) because the piezoelectric element 610 is situated nearer the center of the virtual key 670.

The degree to which each of the ceramic portions 614, 624, and 634 are deflected downward in such an embodiment may affect a magnitude of the piezo actuation signal generated upon such a deflection, and detected across the soldering points of each piezoelectric element. As described herein, as a result of the mechanical stress placed on the piezoelectric material of one or more piezoelectric elements, an electric charge (e.g., piezo actuation signal) is created, and is carried to one or more metal traces coupled to the piezoelectric material and the metal plate of the piezoelectric element via solder points. The electric charge received at the one or more metal traces may be conducted to a haptic controller by the metal trace as described herein. For example, as a result of the mechanical stress placed on the ceramic material 614 of piezoelectric element 610, a first piezo actuation signal may be generated and carried to metal traces coupled to the ceramic portion 614 at solder point 618, and the metal plate 612 at solder point 616. As another example, as a result of the mechanical stress placed on the ceramic material 624 of piezoelectric element 620, a second piezo actuation signal may be generated and carried to metal traces coupled to the ceramic portion 624 at solder point 628, and the metal plate 622 at solder point 626. As yet another example, as a result of the mechanical stress placed on the ceramic material 634 of piezoelectric element 630, a third piezo actuation signal may be generated and carried to metal traces coupled to the ceramic portion 634 at solder point 638, and the metal plate 632 at solder point 636. Each of the first, second, and third piezo actuation signals generated in such a manner have differing voltage magnitudes, due to the different degrees to which each of the ceramic disks 614, 624, and 634 deflected upon downward pressure applied at virtual key 670 in an embodiment. For example, the voltage magnitude of the second piezo actuation signal (associated with a deflection of 30%), in an embodiment in which voltage magnitude and degree of deflection are linearly related, may be equivalent to half the voltage magnitude of the first piezo actuation signal (associated with a deflection of 60%), and the voltage magnitude of the third piezo actuation signal (associated with a deflection of 20%) may be equivalent to one-third the voltage magnitude of the first piezo actuation signal. In other embodiments, the relationship between the degree of deflection and the voltage magnitude may be non-linear or unknown, but common among each of the piezoelectric elements 610, 620, and 630. By comparing the voltage magnitudes of each of the first, second, and third piezo actuation signals received at the haptics controller in such an embodiment, the orientation of each of the piezoelectric elements 610, 620, and 630 with respect to the downward pressure applied at the virtual key 670 may be determined. Because the locations of each of the piezoelectric elements 610, 620, and 630 with respect to the dimensions of the top coversheet display in an embodiment, the haptics controller in such an embodiment may use this determination of the downward pressure location with respect to each of the piezoelectric elements 610, 620, and 630 to determine x- and y-coordinate data associated with the location on the top coversheet display at which the user applied the detected downward pressure.

Upon receipt of the first, second, and third piezo actuation signals in such an embodiment, the haptic controller may send a plurality of electrical signals (e.g., haptic feedback control signals) back to the piezoelectric material of the piezoelectric elements 610, 620, and 630. For example, the haptic controller in such an embodiment may send a first haptic feedback control signal to the piezoelectric element 610, a second haptic feedback control signal to the piezoelectric element 620, and a third haptic feedback control signal to the piezoelectric element 630. This haptic feedback control signal may have a certain voltage, current, and polarity (−, +) sufficient to render the piezoelectric material of the piezoelectric elements 610, 620, and 630 to cause a haptic feedback or sound of varying degrees. For example, the voltage magnitude of the first haptic feedback signal sent to the piezoelectric element 610 in an embodiment may be equivalent to twice the voltage magnitude of the second haptic feedback signal sent to the piezoelectric element 620, and three times the voltage magnitude of the second haptic feedback signal sent to the piezoelectric element 630. These differences in voltage magnitudes may reflect the differences in voltage magnitudes of the received piezo actuation signals received from each of the piezoelectric elements 610, 620, and 630 respectively. These different voltage magnitudes may result in a more intense haptic feedback (movement or sound) at piezoelectric element 610 than the haptic feedbacks at the piezoelectric elements 620, and 630. This may give the user a perception that the haptic feedback originated at a piezoelectric element situated directly beneath the virtual key 670, rather than from each of the three separate piezoelectric elements 610, 620, and 630, situated partially beneath the virtual key 670.

Thus, according to the example embodiments of FIG. 5 and FIG. 6, the reconfigurable haptic interface assembly with top coversheet display may be used to change displayed sizes and locations of a reconfigurable haptic keyboard, haptic touchpad, and haptic palm rest over a fixed array of piezoelectric elements and x, y touch detectors such as a capacitive touch layer according to embodiments herein. Due to the example embodiments of FIG. 5 and FIG. 6, the displayed haptic keyboards, displayed haptic touchpad, and displayed haptic palm rests do not have to line up over corresponding individual piezoelectric elements, although they may as with FIG. 5. Lining up the keys of a reconfigurable haptic keyboard over piezoelectric elements as in FIG. 5 may be a default keyboard location layout and size in one example embodiment. The haptic feedback keyboard and touchpad control system of embodiments herein may operate with the reconfigurable layout controller to coordinate the piezoelectric elements in the array of the reconfigurable haptic interface assembly to be assigned scan codes upon actuation to represent actuation of keys of the haptic keyboard, the haptic touchpad or functions of a haptic palmrest if any. The reconfigurable layout controller and haptic keyboard and touchpad controller may then interpret scan code for particular functions or characters according to the coordinate instructions with the reconfigured layout whether the piezoelectric elements are aligned under keys or not. Further, the haptic controller may provide appropriate haptic feedback control signals for haptic feedback to the reconfigured haptic keyboard, haptic touchpad, and haptic palmrest regardless of what configuration is selected for display on the top coversheet display in embodiments herein.

Figure 7:
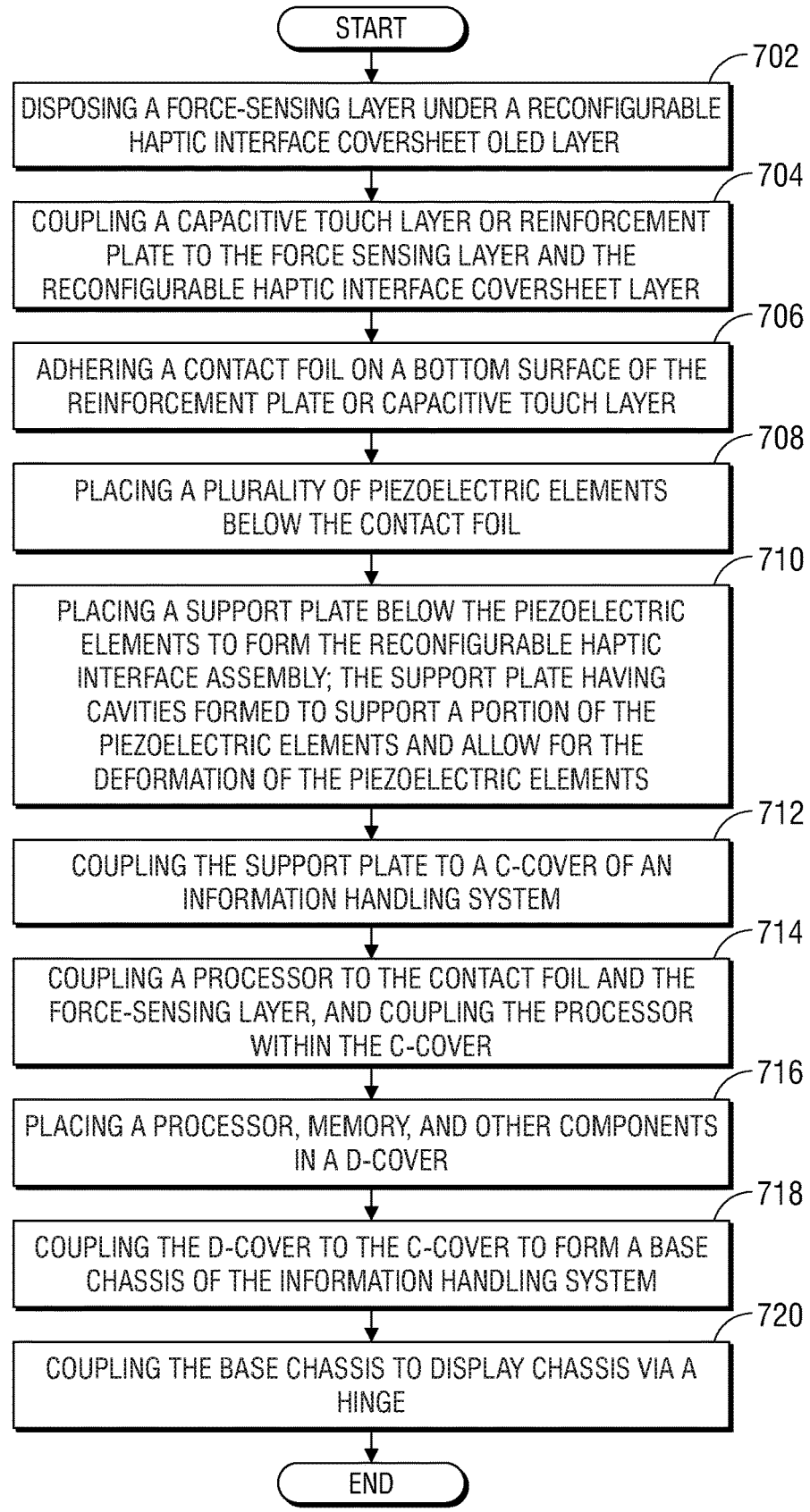
FIG. 7 is a flow diagram illustrating a method of manufacturing a reconfigurable haptic interface assembly according to an embodiment of the present disclosure.

FIG. 7 is a flow diagram illustrating a method of manufacturing a reconfigurable haptic interface assembly of an information handling system with haptic keyboard, touchpad, and palm rest capabilities according to an embodiment of the present disclosure. As described herein, a reconfigurable haptic interface assembly of an information handling system in an embodiment may be capable of displaying modified or user-customized configurations for a keyboard, touchpad, or palm rest, or any combinations of these input surfaces on a coversheet of the C-cover. In order to provide such flexibility in configurations, the reconfigurable haptic interface assembly may be disposed beneath a single coversheet comprising a large portion of the C-cover, to provide capabilities associated with a reconfigurable haptic keyboard, a reconfigurable haptic touchpad, and a reconfigurable haptic palm rest across the entire surface of the coversheet. In other words, the entire coversheet in embodiments described herein may be capable of displaying keys of a keyboard or hot keys of a palm rest, and may be capable of sensing a touch location via a capacitive touch layer of a touchpad located and displayed anywhere on a top coversheet layer of the C-cover. In such a way, any portion of the coversheet may be designated for and utilized as a portion of the keyboard, the touchpad, or the palm rest, according to various configurations in embodiments described herein.

The method 700 may include starting with a reconfigurable haptic interface coversheet display layer and disposing a force-sensing layer below or within a reconfigurable haptic interface coversheet layer in an embodiment at block 702. The reconfigurable haptic interface coversheet layer in an embodiment may be an OLED capable of displaying a keyboard, touchpad, and palm rest in several different configurations that may be set or chosen by the user, or may be set to a default configuration. The force-sensing layer may be disposed beneath the reconfigurable haptic interface coversheet layer, or may be incorporated within it. Examples of force-sensing layers in an embodiment may include force-sensing films, and force-sensing resistors incorporated within or under a plastic or glass layer, for example.

The method 700 in an embodiment may also include coupling a capacitive touch layer or reinforcement plate to a reconfigurable haptic interface coversheet layer or a force sensing layer if one is disposed under the reconfigurable haptic interface coversheet layer at block 704. In some embodiments, a capacitive touch layer may not be included within the reconfigurable haptic interface assembly, and a reinforcement plate without a capacitive touch layer may be included, instead. In other embodiments, the capacitive touch layer may be formed on the OLED display reconfigurable haptic interface coversheet layer or on a contact foil for the piezoelectric elements. The capacitive touch layer may be a grid of sense and drive lines that may be disposed on the OLED, the reinforcement layer or contact foil in various embodiments and operatively coupled to a capacitive touch controller as understood by those of skill. The grid of sense and drive lines may be transparent ITO material in some embodiments. The capacitive touch layer or reinforcement plate may be coupled to the reconfigurable haptic interface coversheet layer using any type of adhesive.

The method 700 may continue with adhering a contact foil on a bottom surface of the capacitive touch layer or reinforcement plate at block 706. Adhering the contact foil to the capacitive touch layer or reinforcement plate may include depositing an adhesive to the bottom surface of the capacitive touch layer or reinforcement plate and placing the contact foil to the bottom surface of the capacitive touch layer or reinforcement plate. The adhesive may be any type of adhesive.

The method 700 may, at block 708, include placing a plurality of piezoelectric elements below the contact foil in an array, as described herein. In an embodiment, each of the plurality of piezoelectric elements may operate as a piezoelectric element for sensing actuation of a keyboard, touchpad, or palm rest interface. In addition, the type of interface actuation (e.g., keyboard actuation, touchpad actuation, palm rest actuation) that a given piezoelectric element is associated with may change during the operation and use of the information handling system by the user, following completion of manufacturing of the information handling system.

The method 700 may also include, at block 710, placing a support plate below the piezoelectric elements to form the reconfigurable haptic interface assembly. The support plate has cavities formed therein to support a portion of the piezoelectric elements while allowing for the deformation of the piezoelectric elements. As described herein, the support may both hold the layers of the assembly together and outer edges of the piezoelectric elements as well as maintain the assembly to a more rigid portion of the information handling system. The method 700 also includes, at block 712, coupling the support plate to the C-cover via a number of screws, bolts or other type of coupling device described herein.

The method 700 may also include coupling a haptics controller or processor to the contact foil and force-sensing layer, and coupling the haptics controller or processor within the C-cover at block 714. The method may continue with placing other processors, a memory, and power systems (e.g. batteries or power transformers and the like) and other information handling system components in the C-cover or D-cover at block 716. The processor may be any type of processing device that may access data from the memory and receive piezo actuation signals from the various piezoelectric elements as described herein. Other components in accordance with the information handling system of FIG. 1 may also be installed in the C-cover or D-cover assembly according to techniques understood in the art for creating motherboards, graphics boards, wireless systems, power systems, bus systems, data ports, cooling systems and the like.

The method 700 also includes, at block 718, coupling a D-cover to the C-cover to form a base chassis of the information handling system. In an embodiment, the C-cover may also include a reconfigurable haptic interface assembly, as described herein. In an alternative embodiment, a mechanical or other type of keyboard may be used. The method 700 may further include coupling the base chassis to a display chassis via a hinge at block 720. The base chassis and display chassis may form a notebook-type information handling system in an example embodiment.

Figure 8:
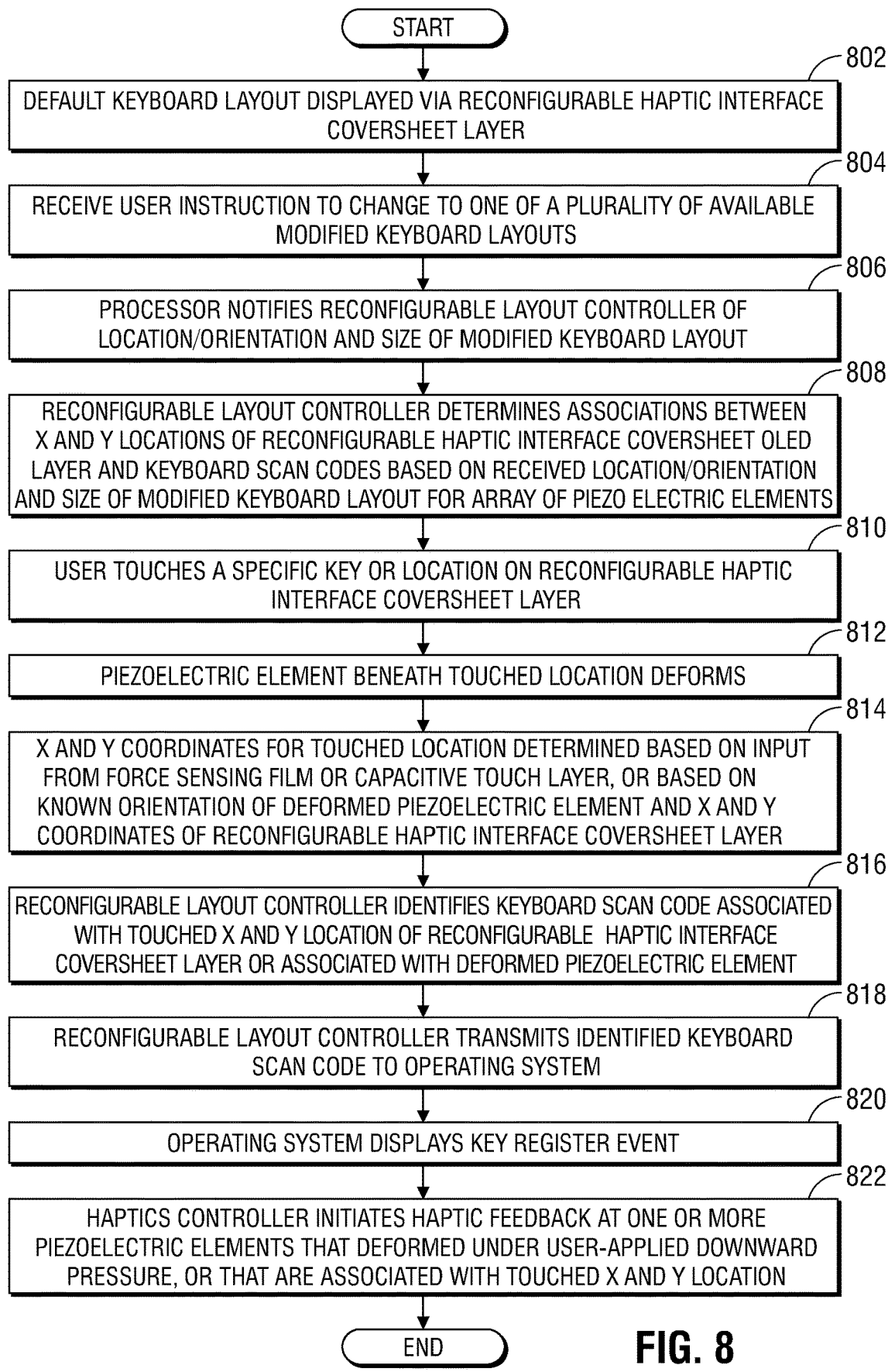
FIG. 8 is a flow diagram illustrating a method of processing user input received via a reconfigurable haptics interface assembly according to an embodiment of the present disclosure.

FIG. 8 is a flow diagram illustrating a method of processing user input received via a reconfigurable haptics interface assembly in a modified configuration according to an embodiment of the present disclosure. As described herein, a reconfigurable haptic interface assembly of an information handling system in an embodiment may be capable of displaying modified or user-customized configurations for a keyboard, touchpad, or palm rest, or any combinations of these input surfaces on a coversheet of the C-cover. The coversheet may serve as an interface layer in some embodiments for a user to actuate the one or more keys, the touchpad area, or to rest palms on the C-cover. Local deformation of the key location of the reconfigurable haptic interface coversheet layer, or one or more piezoelectric elements situated beneath the reconfigurable haptic interface coversheet layer may provide for actuation of the key or touchpad. A haptics controller in an embodiment may receive a piezo actuation signal from a piezoelectric element placed under such local deformation, and send a haptic feedback control signal to the piezoelectric element, varying in polarity, voltage or current to cause the piezoelectric element to provide haptic feedback at the actuation location. The haptics controller, a capacitive touch controller, or both may also determine the x- and y-coordinate data for the location along the surface of the reconfigurable haptics interface coversheet layer where the local deformation occurred. A reconfigurable layout controller in an embodiment may receive these x- and y-coordinate data, associate the x- and y-coordinate data with a portion of the touchpad, or a key within the keyboard or palm rests, based on the locations of each of these interfaces within the modified configuration in which they were displayed at the time of the actuation. In such a way, the reconfigurable layout controller may identify a specific key or portion of the touchpad that was actuated, and the haptics controller may provide haptics feedback at that location.

At block 802, a default keyboard layout may be displayed via a reconfigurable haptic interface coversheet layer. The reconfigurable haptic interface coversheet layer may be an OLED display layer in embodiments herein. For example, in an embodiment described with reference to FIG. 2, the reconfigurable haptics interface portion 230 may display the keyboard 201, touchpad 202, and palm rest 203 in a default configuration mimicking the configuration in which fixed and mechanical keyboards, touchpad, and palm rests of traditional laptop devices may be placed.

A user instruction to change to one of a plurality of available modified keyboard layouts may be received in an embodiment at block 804. For example, a processor or a reconfigurable layout controller in an embodiment may receive a user instruction to move the location, size, or orientation of the keyboard, touchpad, or palm rests. In an embodiment described with reference to FIG. 4, for example, the reconfigurable layout controller or processor may receive a user instruction to display the keyboard 401 closer to the front edge of the C-cover 435, and further from the display chassis 408, than the keyboard was displayed in the default configuration discussed directly above. The user instruction to move or size the reconfigurable haptic keyboard, reconfigurable haptic touchpad, or reconfigurable haptic palmrest may be received from a user according to a variety of embodiments. In one embodiments, a GUI maybe accessed via a display screen to input an instruction to modify layout and sizing on the reconfigurable haptic interface coversheet layer display. The GUI may have drop down menus or graphic selection options for a user to select among available layouts and sizes or may be used to customize a layout and size. In other embodiments, the reconfigurable haptic interface coversheet layer display may have a virtual toggle or a control (or a hard key may be present on the information handling system) to permit changes to the layout of the reconfigurable haptic keyboard, haptic touchpad, or haptic palmrest in some embodiments. The changes may be input into the reconfigurable haptic interface coversheet layer display via a touchscreen activation and gestures to select the reconfigurable haptic keyboard, the reconfigurable haptic touchpad, or reconfigurable haptic palmrest and move them or size them with gesture inputs. This way a user may swipe, move, pinch, rotate, grab, or otherwise alter the layout displayed on the reconfigurable haptic interface coversheet layer and the instruction to change may be input to the haptic feedback keyboard and touchpad control system.

In other embodiments, a user may provide an instruction to stop displaying one or more of the keyboard, touchpad, or palm rest interfaces, or may move the locations of each of these interfaces with respect to one another and with respect to the display chassis. In still other embodiments, a user may provide an instruction to change the size of one or more of these interfaces, or may rotate one or more of these interfaces, alone or in combination, such that one or more of them have a different orientation with respect to the display chassis.

At block 806, the processor may notify the reconfigurable layout controller of the location, orientation, and size of the modified keyboard layout. For example, in an embodiment in which the processor received the user instruction at block 804, the processor may forward this user instruction to the reconfigurable layout controller. In such an embodiment, the reconfigurable layout controller or another controller (e.g., graphics controller) may set the reconfigurable haptics interface coversheet layer to display the keyboard, touchpad, or palm rests according to the modified configuration set by the user at block 804.

The reconfigurable layout controller in an embodiment at block 808 may determine associations between x- and y-coordinate data for the reconfigurable haptic interface coversheet layer and keyboard scan codes, based on the received location, orientation, and size of the user interfaces within the modified configuration. Upon receipt of the location, orientation, and size information for the modified keyboard layout, the reconfigurable layout controller in such an embodiment may determine the x- and y-coordinate locations for each of the keys relative to the array of piezoelectric elements within reconfigurable haptics interface assembly under the haptic keyboard currently displayed according to the modified configuration. In such a way, although the locations for each of the displayed keys may have changed when the configuration of the keyboard was modified by the user, the reconfigurable layout controller may be capable of determining the new locations at which each of the keys are currently displayed according to the modified configuration. The reconfigurable layout controller in an embodiment may associate each of the keys of the keyboard or palm rest interfaces, as well as the boundaries of the touchpad interface currently displayed according to the modified configuration with a set of x- and y-coordinate data describing a specific location on the surface of the reconfigurable haptic interface coversheet layer and associate those reconfigured haptic keyboard, haptic touchpad and haptic palm rest, if any, with underlying piezoelectric elements in such a way. For locations associated with a specific key of the keyboard or touchpad or palm rest interfaces in such an embodiment, the reconfigurable layout controller may further associate the x- and y-coordinate data associated with each specific key or actuation location with a keyboard or other scan code for that key or actuation location.

At block 810, the user may touch a specific key or location on the reconfigurable haptic interface coversheet layer in an embodiment. For example, in an embodiment described with reference to FIG. 4, the user may apply a downward pressure with a finger on a key within the keyboard 401 or palm rest 403, or within the touchpad 402. Such downward pressure applied may prompt actuation of a piezoelectric element or a portion of a force-sensing element in an embodiment, while the contact of the user's finger with either or both the force-sensing element or the capacitive touch element may prompt detected contact at known x- and y-coordinates along the reconfigurable haptics interface coversheet layer

407. The x and y coordinates may be detected by a capacitive touch layer in some embodiments.

In an embodiment in which a piezoelectric element is situated beneath the reconfigurable haptics interface coversheet layer, the piezoelectric element situated beneath the location where the user applied downward pressure may deform under such downward pressure at block 812. As described herein, the reconfigurable haptic interface coversheet layer in an embodiment may be comprised of a rigid glass, or flexible plastic type material as part of an display. In an embodiment in which the reconfigurable haptic interface coversheet layer comprises a flexible plastic type material, the downward pressure applied by the user to the reconfigurable haptics interface coversheet layer may also cause one or more piezoelectric elements situated beneath the reconfigurable haptics interface coversheet layer to deform under such downward pressure. In an embodiment in which the reconfigurable haptic interface coversheet layer comprises a rigid glass type material that does not allow for deformation of the underlying piezoelectric elements under user applied downward pressure, a force-sensing element disposed beneath, or within the reconfigurable haptic interface coversheet layer may sense the downward pressure applied by the user, as well as the x- and y-coordinates on the reconfigurable haptics interface coversheet layer at which such downward pressure was applied. In some embodiments, a capacitive touch layer may detect the x- and y-coordinates on the reconfigurable haptics interface coversheet layer.

At block 814, x- and y-coordinates for the location at which the user applied downward pressure may be determined. As described herein, such x- and y-coordinate data may be determined through a variety of methods, based on the composition of the reconfigurable haptics interface assembly in an embodiment. For example, in an embodiment described directly above, in which a force-sensing element is incorporated beneath or within a reconfigurable haptics interface cover sheet layer comprising a rigid glass-type material, the force-sensing element that detects the downward pressure applied by the user may also associate that downward pressure with a x- and y-location on the reconfigurable haptic interface coversheet layer, based on a known location of the force-sensing element with respect to the boundaries of the coversheet layer. As another example, in an embodiment in which the downward pressure applied to a reconfigurable haptic interface coversheet layer comprising a deformable material (e.g., type of plastic) allows for deformation of an underlying piezoelectric element, the x- and y-coordinate data for the downward pressure may be determined based on a known orientation or placement of the piezoelectric element with respect to the boundaries of the coversheet layer. In still another embodiment in which a capacitive touch layer is disposed between the coversheet layer and the contact foil layer, the x- and y-coordinate data may be determined based on a location at which the capacitive touch layer registers contact of the user's finger, and a known orientation of the capacitive touch layer with the boundaries of the coversheet layer.

The reconfigurable layout controller in an embodiment may identify a keyboard scan code associated with the x- and y-coordinate data at block 816. As described above with respect to block 808, the reconfigurable layout controller in an embodiment may associate each key of the keyboard or palm rest, or the boundaries of the touchpad, as displayed according to the modified configuration, with specific x- and y-coordinates and corresponding piezoelectric elements. The haptics controller may interpolate one or more corresponding piezoelectric element actuations with a location of a key or touch location from the reconfigured keyboard, touchpad, or other I/O device displayed according to embodiments herein. Once the x- and y-coordinates for the location at which the user applied downward pressure at block 810 are known, the reconfigurable layout controller in such an embodiment may cross-reference these associations to determine which key of the keyboard or palm rest, or what portion of the touchpad the user pressed at block 810 and what actuation signals may be received from the associated piezoelectric element or elements according to embodiments above. As described herein, a haptic key may be located directly over a piezoelectric element or may be partially detected by a plurality of piezoelectric elements when over a middle area of the piezoelectric element array. According to embodiments above, location and piezoelectric element actuation may be interpolated to identify the scan code associated with a key. In an embodiment in which it is determined the user pressed a key on the keyboard or the touchpad or palm rest interfaces, the reconfigurable layout controller may further determine the keyboard scan code associated with the key the user pressed.

At block 818, the reconfigurable layout controller in an embodiment may transmit the identified keyboard scan code or an indication the touchpad has been actuated to the processor or operating system of the information handling system. In an embodiment in which it is determined a key has been pressed, the processor or operating system may receive user input in the form of the keyboard scan code. In an embodiment in which it is determined the touchpad has been actuated, the reconfigurable layout controller may transmit an indication to the processor or information handling system that the user has made a selection by actuating the touchpad at the determined x- and y-coordinates. These scan codes may be associated with characters or functions for software applications operating on the processor of the information handling system.

The operating system or processor in an embodiment may display a key register event, or display selection of a graphically displayed object at block 820. For example, in an embodiment in which the reconfigurable layout controller transmits a keyboard scan code at block 818, the operating system or processor may process the received keyboard scan code by registering it as a key stroke for the specific key associated with that scan code and selected by the user at block 810. As another example, in an embodiment in which the reconfigurable layout controller transmits an indication of touchpad actuation, the processor or operating system of the information handling system may associate the x- and y-coordinate data describing the location on the touchpad the user actuated with the location of an object graphically displayed on a digital display. In such an embodiment, the processor or operating system may register the touchpad actuation as a user input to select that graphically displayed object, for example.

At block 822, the haptics controller in an embodiment may initiate haptic feedback at one or more piezoelectric elements associated with the user-initiated actuation location on the reconfigurable haptic interface coversheet layer. As described herein, the piezoelectric elements in some embodiments may be capable of deflection under downward pressure applied by the user at a location on the reconfigurable haptics interface coversheet layer. In such an embodiment, one or more piezoelectric elements situated beneath or nearby the actuation location at which the user applied such downward pressure may transmit piezo actuation signals to the haptics controller in response to such a deflection. The haptics controller in such an embodiment may respond by transmitting a haptic feedback controller signal to the same one or more piezoelectric elements, causing them to warp upwards or downwards and produce a haptic feedback (e.g., click, upward or downward movement, or audible sound). As also described herein, the piezoelectric elements in other embodiments may not be capable of deflection under such downward pressure applied by a user. In such an embodiment, the x- and y-coordinates of the applied downward pressure may be determined via a force-sensing element, as described with reference to block 814 above. One or more piezoelectric elements disposed beneath the coversheet layer in such an embodiment may be associated with these determined x- and y-coordinates, based on known locations and orientations of the piezoelectric elements with respect to the boundaries of the coversheet layer. In such an embodiment, the haptics controller may transmit a haptic feedback control signal to the one or more piezoelectric elements associated with the determined x- and y-coordinates for the actuation location, causing those one or more piezoelectric elements to warp upwards or downwards and produce a haptic feedback (e.g., click, upward or downward movement, or audible sound). In such a way, the reconfigurable layout controller and haptics controller or processor of an information handling system may operate in tandem to associate actuation of a key or touchpad displayed according to a modified configuration with the proper user instruction, and provide haptic feedback at that location the user can feel or hear.

Figure 9:
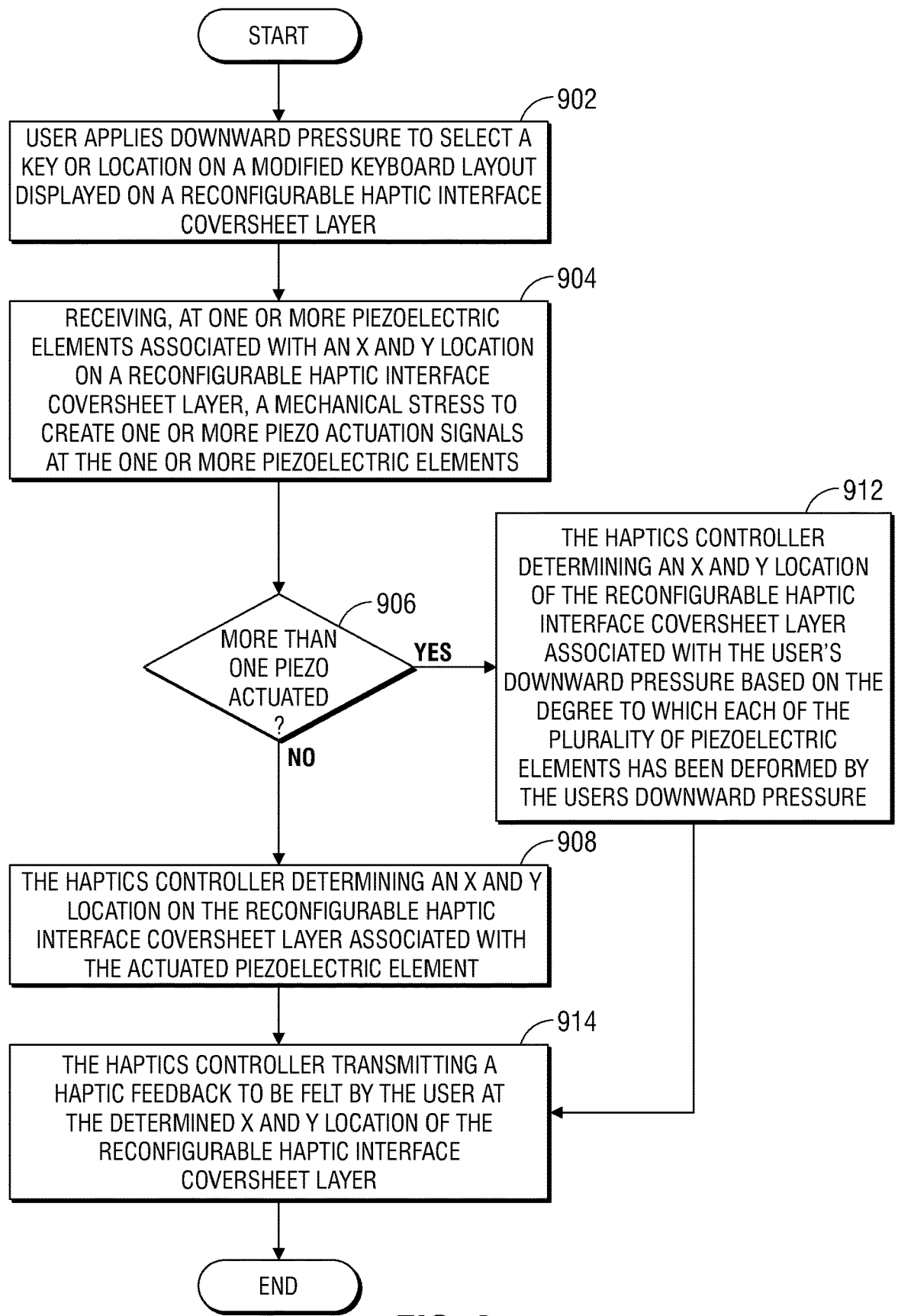
FIG. 9 is a flow diagram illustrating a method of providing haptic feedback at an actuation location according to an embodiment of the present disclosure.

FIG. 9 is a flow diagram illustrating a method of providing haptic feedback at an actuation location on a reconfigurable haptic interface cover sheet displaying a modified configuration according to an embodiment of the present disclosure. At block 902, a user may apply a downward pressure to select a key or portion of a touchpad displayed on the haptic interface coversheet layer according to the modified configuration. For example, in an embodiment described with reference to FIG. 4, the user may apply a downward pressure with a finger on a key within the keyboard 401 or palm rest 403, or within the touchpad 402. Such downward pressure applied may prompt actuation of a piezoelectric element or a portion of a force-sensing element in an embodiment, while the contact of the user's finger with either or both the force-sensing element or the capacitive touch element may prompt detected contact at known x- and y-coordinates along the reconfigurable haptics interface coversheet layer 407.

A mechanical stress may be received at one or more piezoelectric elements disposed beneath the location on the reconfigurable haptics interface coversheet layer where the user applied the downward pressure at block 904 in an embodiment. For example, in an embodiment described with reference to FIG. 5, a mechanical stress may be received at the piezoelectric element 510 disposed beneath the key 540 at which the user applies downward pressure. As another example, in an embodiment described with respect to FIG. 6, a mechanical stress may be received at the piezoelectric elements 610, 620, and 630, each disposed partially beneath or nearby the key 670 at which the user applies downward pressure. Nearby piezoelectric elements do not necessarily situate underneath the key 670 in embodiments herein, but instead the key 670 may be situated over space between piezoelectric elements in embodiments herein.

At block 906, it may be determined whether more than one piezoelectric element has been actuated. Upon application of the mechanical stress described with respect to block 904, each piezoelectric element undergoing such mechanical stress may transmit a piezo actuation signal to the haptics controller in an embodiment. In an embodiment in which multiple piezoelectric elements undergo mechanical stress simultaneously, the haptics controller may receive multiple piezo actuation signals simultaneously, or in very close succession. If the haptics controller receives more than one piezo actuation signal at a time, and above a threshold level in some embodiments, the method may proceed to block 912 for determination of the x- and y-coordinates of the location on the reconfigurable haptics interface coversheet layer at which the user applied the downward pressure that prompted the piezo actuation signals. If the haptics controller receives a single piezo actuation signal, this may indicate the user applied downward pressure at x- and y-coordinates on the reconfigurable haptics interface coversheet layer situated directly above the actuated piezoelectric element, and the method may proceed to block 908.

At block 908, in an embodiment in which a single piezoelectric element is actuated by the user's application of downward pressure on the reconfigurable haptics interface coversheet layer, the haptics controller in an embodiment may determine x- and y-coordinates for the location on the reconfigurable haptic interface coversheet layer at which the user applied the downward pressure. The x- and y-coordinate data for the downward pressure may be determined based on a known orientation or placement of the piezoelectric element with respect to the boundaries of the coversheet layer in such an embodiment. For example, the x- and y-coordinate data for the key 540 in an embodiment described with reference to FIG. 5 may be determined based on a known placement of the piezoelectric element 510 with respect to the reconfigurable haptic interface coversheet layer. The haptics controller in such an embodiment may then determine scan codes for character or function commands from these x- and y-coordinates or the actuated piezoelectric element as defined by the reconfigurable layout controller or processor, as described in greater detail with reference to embodiments above. The method may then proceed to block 914 for generation of haptic feedback at the actuation location.

In an embodiment in which multiple piezoelectric elements are actuated by the user's application of downward pressure on the reconfigurable haptics interface coversheet layer as determined at block 910, the haptics controller may determine x- and y-coordinates for the actuation location based on the multiple received piezo actuation signals at block 912. For example, in an embodiment described with reference to FIG. 6, each of the first, second, and third piezo actuation signals generated at piezoelectric elements 610, 620, and 630, respectively, may have differing voltage magnitudes, due to the different degrees to which each of the ceramic disks 614, 624, and 634 deflected upon downward pressure applied at virtual key 670 in an embodiment. For example, the voltage magnitude of the second piezo actuation signal (associated with a deflection of 30%), in an embodiment in which voltage magnitude and degree of deflection are linearly related, may be equivalent to half the voltage magnitude of the first piezo actuation signal (associated with a deflection of 60%), and the voltage magnitude of the third piezo actuation signal (associated with a deflection of 20%) may be equivalent to one-third the voltage magnitude of the first piezo actuation signal. By comparing the voltage magnitudes of each of the first, second, and third piezo actuation signals received at the haptics controller in such an embodiment, the orientation of each of the piezoelectric elements 610, 620, and 630 with respect to the downward pressure applied at the virtual key 670 may be determined. Because the locations of each of the pieozoelectric elements 610, 620, and 630 with respect to the dimensions of the top coversheet display are known in an embodiment, the haptics controller in such an embodiment may use this determination of the downward pressure location with respect to each of the piezoelectric elements 610, 620, and 630 to interpolate to determine x- and y-coordinate data associated with the location on the top coversheet display at which the user applied the detected downward pressure. The interpolated actuation signals from piezoelectric elements 610, 620, and 630 and any x- and y-coordinate data may be used by the haptics controller for the keyboard or touchpad to identify scan codes for characters or functions associated with a key 670 or an actuation location on a haptic touchpad. Once determining which key 670 or if a touchpad or other I/O actuation location has been actuated, the method may proceed to block 914 for generation of haptic feedback control signals to generate corresponding haptic feedback.

At block 914, the haptics controller in an embodiment may transmit a haptic feedback to be felt by the user at the determined x- and y-location of the reconfigurable haptic interface coversheet layer. In an embodiment in which a single piezoelectric element was actuated at block 904, the haptics controller may receive a single piezo actuation signal from that single piezoelectric element, and may transmit a corresponding haptic feedback control signal to the same single piezoelectric element. This may cause the piezoelectric element situated directly beneath the location of the reconfigurable haptic interface coversheet layer at which the user applied downward pressure to warp upwards or downwards, causing haptic feedback to be felt by the user at the actuation location on the reconfigurable haptic interface coversheet layer.

In another embodiment, in which multiple piezoelectric elements were actuated at block 904, the haptics controller may transmit a plurality of haptic feedback control signals to the multiple piezoelectric elements. For example, in an embodiment described with reference to FIG. 6, upon receipt of the first, second, and third piezo actuation signals, the haptic controller may send a plurality of electrical signals (e.g., haptic feedback control signals) back to the piezoelectric material of the piezoelectric elements 610, 620, and 630. The haptic controller in such an embodiment may, for example, send a first haptic feedback control signal to the piezoelectric element 610, a second haptic feedback control signal to the piezoelectric element 620, and a third haptic feedback control signal to the piezoelectric element 630. This haptic feedback control signal may have a certain voltage, current, and polarity (−, +) sufficient to render the piezoelectric material of the piezoelectric elements 610, 620, and 630 to cause a haptic feedback or sound of varying degrees. For example, the voltage magnitude of the first haptic feedback signal sent to the piezoelectric element 610 in an embodiment may be equivalent to twice the voltage magnitude of the second haptic feedback signal sent to the piezoelectric element 620, and three times the voltage magnitude of the second haptic feedback signal sent to the piezoelectric element 630. These differences in voltage magnitudes may reflect the differences in voltage magnitudes of the received piezo actuation signals received from each of the piezoelectric elements 610, 620, and 630 respectively. These different voltage magnitudes may result in a more intense haptic feedback (movement or sound) at piezoelectric element 610 than the haptic feedbacks at the piezoelectric elements 620, and 630. This may give the user a perception that the haptic feedback originated at a piezoelectric element situated directly beneath the virtual key 670 in some embodiments, rather than from each of the three separate piezoelectric elements 610, 620, and 630, situated partially beneath the virtual key 670. In such a way, the haptics controller may provide haptic feedback to be felt or heard by the user at the location on the reconfigurable haptic interface coversheet layer at which the user applied the downward pressure.

The blocks of the flow diagrams of FIGS. 7, 8 and 9 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A reconfigurable haptic feedback interface assembly of an information handling system, comprising:
   a reconfigurable haptic interface coversheet display layer to display a key location of a haptic keyboard based on a selected keyboard configuration selected from a plurality of modifiable keyboard configurations by selection of a displayed layout of the reconfigurable haptic interface coversheet display layer on a C-cover covering a top of a base portion for the information handling system, where the information handling system has the base portion and a display portion;
   a contact foil placed between the reconfigurable haptic interface coversheet display layer and a support layer;
   a first piezoelectric element placed between the contact foil and the support layer configured to receive a first applied mechanical stress near the displayed key location of the displayed layout of the reconfigurable haptic interface coversheet display layer, to generate a first piezo actuation signal having a first voltage magnitude in response to the first applied mechanical stress, and to transmit the first piezo actuation signal via the contact foil;

a controller of the information handling system operatively coupled to the contact foil and executing instructions to:

receive the first piezo actuation signal from the first piezoelectric element;

identify x- and y-coordinate location data describing the key location and determine an actuation of the displayed key location based, in part, on the first voltage magnitude of the first piezo actuation signal generated in response to the first applied mechanical stress;

identify a keyboard scan code associated in a memory with the x- and y-coordinate location data describing the key location for the selected keyboard configuration;

send a first haptic feedback response signal to the first piezoelectric element, in response to the first piezo actuation signal, to cause the first piezoelectric element to generate a first haptic feedback at the key location; and a digital display displaying a key register event based on the keyboard scan code.

2. The system of claim 1 further comprising:
a second piezoelectric element to receive a second applied mechanical stress at the key location of the displayed layout of the reconfigurable haptic interface coversheet display layer, generate a second piezo actuation signal having a second voltage magnitude, and transmit the second piezo actuation signal to the processor via the contact foil;
the controller executing instructions to receive the second piezo actuation signal; and
the controller executing instructions to identify the x- and y-coordinate location data describing the key location based, in part, on interpolation of the second voltage magnitude of the second piezo actuation signal and the first voltage magnitude of the first piezo actuation signal.

3. The system of claim 2 further comprising:
the controller executing instructions to send a second haptic feedback response signal to the second piezoelectric element to cause the second piezoelectric element to generate a combined haptic feedback at the key location simultaneous with the first piezoelectric element generating the first haptic feedback at the key location.

4. The system of claim 1 further comprising:
a capacitive touch layer placed between the reconfigurable haptic interface coversheet display layer and a support layer, operably connected to a processor of the information handling system, detecting a user touch at an x- and y-coordinate location for the key location; and
the controller executing instructions to identify the x- and y-coordinate location data describing the displayed key location based, in part, on the user touch detected by the capacitive touch layer.

5. The system of claim 1 further comprising:
a force-sensing element disposed within the reconfigurable haptic interface coversheet display layer operably connected to a processor detecting downward actuation pressure applied at the x- and y-coordinate location of the reconfigurable haptic interface coversheet display layer; and the controller executing instructions to identify the x- and y-coordinate location data describing the key location based, in part, on the downward actuation pressure detected by the force-sensing element.

6. The assembly of claim 5, wherein the force-sensing element is a thin film incorporating a force-sensing resistor.

7. The system of claim 1 further comprising:
a graphical user interface on the reconfigurable haptic interface coversheet display layer to accept touch input gestures as input commands to determine the keyboard location as selected from the plurality of modifiable keyboard configurations by selection of the displayed layout of the reconfigurable haptic interface coversheet display layer on the C-cover for the information handling system and reset one or more piezo electric elements associated with a new displayed key location via a reconfigurable layout controller.

8. A reconfigurable haptic feedback interface assembly of an information handling system, comprising:
a reconfigurable haptic interface coversheet display layer to identify an actuation location on a C-cover covering a top of a base portion for the information handling system having the base portion and a display portion having a first display device, where the reconfigurable haptic interface coversheet display layer is an organic light emitting diode (OLED) display layer that is a second display for the base portion;
a first piezo electric element disposed below the reconfigurable haptic interface coversheet display layer operably connected to a processor of the information handling system and configured to detect a first downward actuation pressure applied at a first display x- and y-coordinate location of the reconfigurable haptic interface coversheet display layer and configured to generate a piezo actuation signal in response to the first downward actuation pressure;
a contact foil placed between the reconfigurable haptic interface coversheet display layer and a support layer;
the processor operatively coupled to the contact foil and executing instructions to:
identify a first piezo x- and y-coordinate location data for the piezo electric element corresponding to the first display x- and y- coordinate location of the reconfigurable haptic interface coversheet display layer as an actuation location;
identify a user input command instruction corresponding with the first downward actuation pressure applied at the first display x- and y-coordinate location;
send a haptic feedback response signal to the piezoelectric element to cause the piezoelectric element to generate a haptic feedback at the actuation location; and
execute the user input command instruction.

9. The assembly of claim 8, wherein the actuation location is a key location of a haptic keyboard based on a selected keyboard configuration selected from a plurality of modifiable keyboard configurations available by selection of a displayed layout of the reconfigurable haptic interface coversheet display layer, and the user input command instruction is a keyboard scan code corresponding with the first display x- and y-coordinate location for the selected keyboard configuration of the reconfigurable haptic interface coversheet display layer.

10. The assembly of claim 9 further comprising:
a digital display displaying a key register event based on the keyboard scan code.

11. The assembly of claim 8, wherein the actuation location is a touch location of a haptic touchpad interface area based on a selected touchpad configuration selected from a plurality of modifiable touchpad configurations by selection of the displayed layout of the reconfigurable haptic interface coversheet display layer, and the user input command instruction is a user selection of an object displayed on a graphical user interface, via the first display device, and associated with the first display x- and y-coordinate location for the selected touchpad configuration of the reconfigurable haptic interface coversheet display layer.

12. The assembly of claim 11 further comprising:
the first display device displaying the user selection of the object on the graphical user interface.

13. The assembly of claim 8 further comprising:
a second piezoelectric element to detect a second downward actuation pressure near the first display x- and y-coordinate location of the reconfigurable haptic interface coversheet display layer, generate a second piezo actuation signal in response to the second downward actuation pressure having a voltage magnitude different from the first piezo actuation signal, and transmit the second piezo actuation signal to the processor via the contact foil; and
the processor executing instructions to receive the second piezo actuation signal and to identify a second display x- and y-coordinate location describing a second actuation location based, in part, on the voltage magnitude difference between the first piezo actuation signal and the second piezo actuation signal.

14. The assembly of claim 13 further comprising:
the processor executing instructions to send a second haptic feedback response signal to the second piezoelectric element to cause the second piezoelectric element to generate a combined haptic feedback at the second display x- and y-coordinate location describing the second actuation location simultaneous with the first piezoelectric element generating a first haptic feedback at first display x- and y-coordinate location describing the actuation location.

15. A reconfigurable haptic feedback interface of an information handling system, comprising:
a reconfigurable haptic interface coversheet display layer to identify a key location of a haptic keyboard based on a selected keyboard configuration selected from a plurality of modifiable keyboard configurations by selection of a displayed layout of the reconfigurable haptic interface coversheet display layer on a C-cover covering a top of a base portion for the information handling system, where the information handling system has the base portion and a display portion;
a capacitive touch layer placed between the reconfigurable haptic interface coversheet display layer and a support layer, operably connected to a processor of the information handling system, to detect a user touch at an x- and y-coordinate location for a displayed key location;
a contact foil placed between the reconfigurable haptic interface coversheet display layer and the support layer;
a first piezoelectric element placed between the contact foil and the support layer configured to receive -a first applied mechanical stress at the key location of the displayed layout of the reconfigurable haptic interface coversheet layer, to generate a first piezo actuation signal in response to the first applied mechanical stress, and to transmit the first piezo actuation signal via the contact foil;
a controller operatively coupled to the contact foil and executing instructions to:
receive the first piezo actuation signal from the first piezoelectric element;
receive the x- and y-coordinate location from the capacitive touch layer;
identify a keyboard scan code associated in the memory with x- and y-coordinate location data for the selected keyboard configuration and actuation of the first piezoelectric element;
send a first haptic feedback response signal to the first piezoelectric element, generated in response to the first applied mechanical stress, to cause the first piezoelectric element to generate a first haptic feedback at the displayed key location; and
a digital display displaying a key register event based on the keyboard scan code.

16. The system of claim 15 further comprising:
a second piezoelectric element to receive a second applied mechanical stress near the displayed key location of the reconfigurable haptic interface coversheet display layer, generate a second piezo actuation signal having a voltage magnitude different from the first piezo actuation signal, and transmit the second piezo actuation signal to the controller via the contact foil;
the controller executing instructions to receive the second piezo actuation signal and to identify x- and y-coordinate location data describing the displayed key location based, in part, on the voltage magnitude difference between the first piezo actuation signal and the second piezo actuation signal.

17. The system of claim 16 further comprising:
the controller executing instructions to send a second haptic feedback response signal to the second piezoelectric element to cause the second piezoelectric element to generate a combined haptic feedback at the displayed key location simultaneous with the first piezoelectric element generating a first haptic feedback at the key location.

18. The system of claim 15 further comprising:
a graphical user interface to accept user input commands to determine a location of a haptic keyboard as selected from the plurality of modifiable keyboard configurations by selection of the displayed layout of the reconfigurable haptic interface coversheet display layer on the C-cover for the information handling system and reset one or more piezo electric elements associated with a new displayed key location via a reconfigurable layout controller.

19. The system of claim 15 further comprising:
a graphical user interface to accept user input commands to determine a size of a haptic keyboard as selected from the plurality of modifiable keyboard configurations by selection of the displayed layout of the reconfigurable haptic interface coversheet display layer on the C-cover for the information handling system and reset one or more piezo electric elements associated with a new displayed key location via a reconfigurable layout controller.

20. The system of claim 15 further comprising:
a graphical user interface on the reconfigurable haptic interface coversheet display layer to accept touch input gestures as input commands to modify a location of a haptic keyboard on the C-cover for the information handling system away from a default configuration mimicking a fixed, mechanical keyboard layout, and reset one or more piezo electric elements associated with a new displayed key location via a reconfigurable layout controller.

* * * * *